United States Patent [19]

Nishimoto et al.

[11] 4,357,512
[45] Nov. 2, 1982

[54] APPARATUS FOR CONTINUOUS MANUFACTURE OF BUTT-WELDED PIPE

[75] Inventors: Koji Nishimoto; Kenji Higuchi; Toshiyuki Oki; Nobuo Machida, all of Ibaraki, Japan

[73] Assignee: Sumitomo Kinzoku Kogyo Kabushiki Kaisha, Osaka, Japan

[21] Appl. No.: 171,542

[22] Filed: Jul. 23, 1980

[51] Int. Cl.$^3$ .......................... H05B 6/06; H05B 6/40
[52] U.S. Cl. .................................. 219/8.5; 219/10.79; 219/10.77; 219/10.61 R; 219/10.71; 219/10.43
[58] Field of Search ...................... 219/8.5, 9.5, 10.43, 219/7.5, 10.69, 10.79, 10.77, 10.75, 10.71, 10.57, 10.61, 10.49, 10.67, 10.73, 59.1, 60.2, 110

[56] References Cited

U.S. PATENT DOCUMENTS

| | | | |
|---|---|---|---|
| 2,673,274 | 3/1954 | Vaughan et al. | 219/8.5 |
| 2,762,892 | 9/1956 | Park | 219/10.79 X |
| 3,648,009 | 3/1972 | Steigerwald | 219/110 X |
| 3,735,084 | 5/1973 | Urbanic et al. | 219/8.5 X |
| 3,824,366 | 7/1974 | Garnier | 219/8.5 X |

FOREIGN PATENT DOCUMENTS

| | | | |
|---|---|---|---|
| 43-14092 | 7/1968 | Japan . | |
| 54-127049 | 10/1979 | Japan | 219/10.77 |
| 54-146038 | 11/1979 | Japan | 219/10.77 |
| 393819 | 5/1977 | Sweden | 219/10.71 |

Primary Examiner—C. L. Albritton
Assistant Examiner—Philip H. Leung
Attorney, Agent, or Firm—Wenderoth, Lind & Ponack

[57] ABSTRACT

An apparatus for continuous manufacture of butt-welded pipes is constituted by a heating furnace for heating a skelp continuously passed therethrough up to a predetermined temperature less than the butt-welding temperature for the material of the skelp, heaters adjacent the outlet end of the heating furnace and having spaced opposed induction heating coils on opposite sides of the path along which the skelp is passed through the heaters and adjacent the edge portions of the skelp for heating only the edge portions of the skelp discharged from the heating furnace up to the butt-welding temperature. The induction heating coils are such that the electromagnetic coupling between the induction heating coils and the corresponding edge portions of the skelp can be varied to adjust the temperature to which the edge portions are heated. A bending device adjacent the outlet end of the heaters bends the skelp into a generally tubular form, and butt-welding rolls adjacent the outlet end of the bending apparatus apply a predetermined pressure to the bent up skelp for butt-welding the edges of the skelp to each other. A cooling device along the path of the pipe between pairs of contracting rolls cools the seamed portion of the pipe to the temperature of the remainder of the pipe.

19 Claims, 22 Drawing Figures

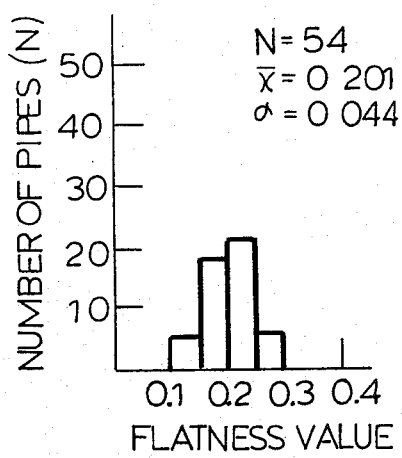
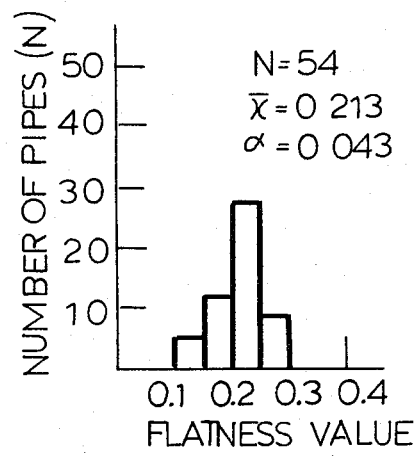
FIG.15a  FIG.15b
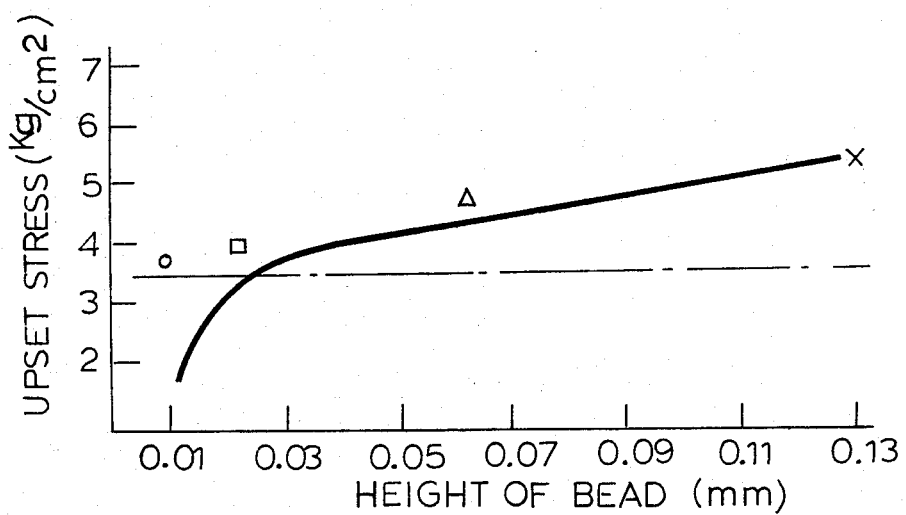
FIG.11

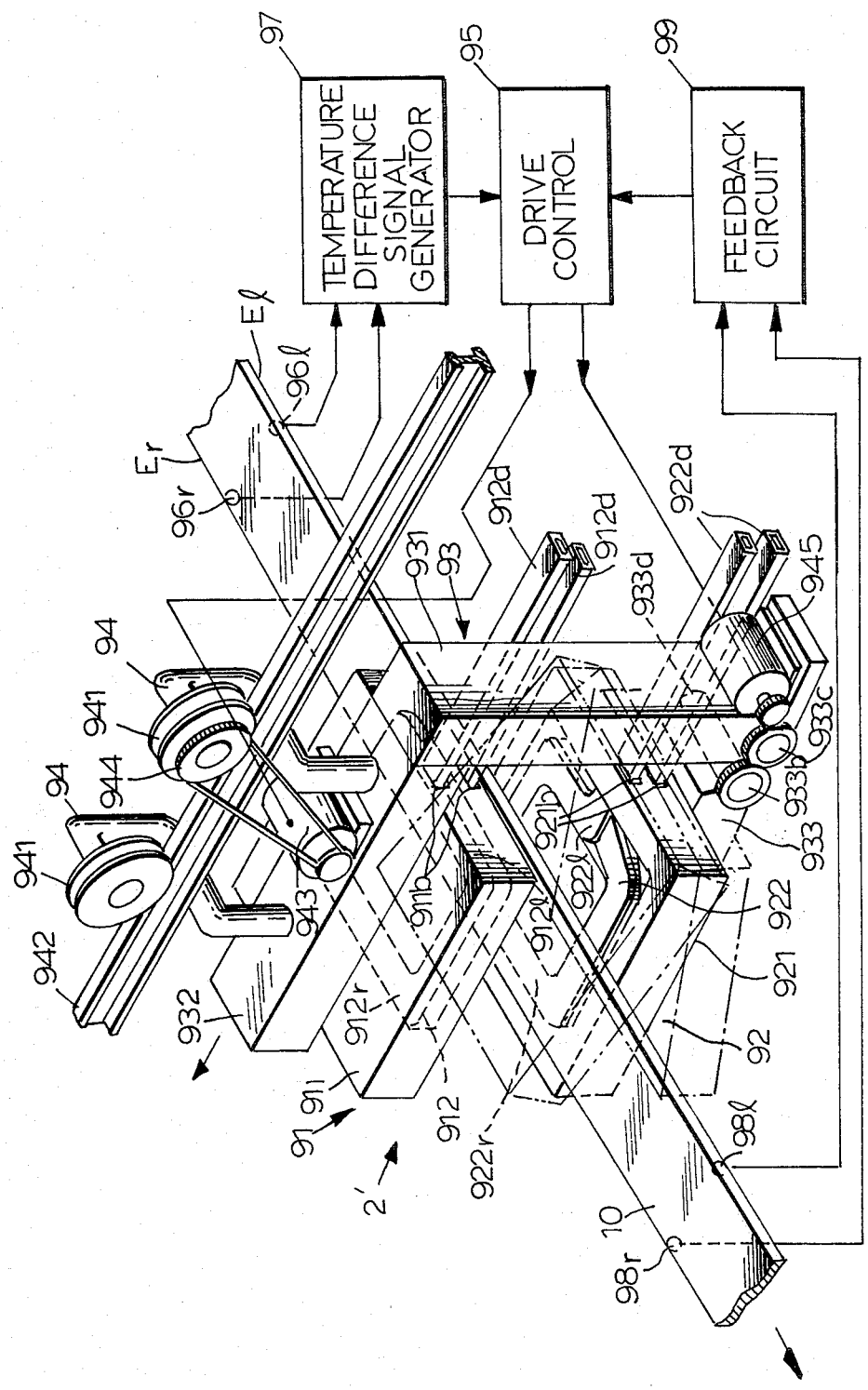

APPARATUS FOR CONTINUOUS MANUFACTURE OF BUTT-WELDED PIPE

BACKGROUND OF THE INVENTION

This invention relates to apparatus for continuous manufacturing of butt-welded pipes, e.g., butt-welded steel pipes, by heating a skelp, bending it into a tubular shape, and butt-welding the opposite edges of the skelp to each other.

Generally, butt-welded pipes are manufactured by heating the edges of the skelp by passing the skelp through a heating furnace at a temperature of 1300° C. suitable for butt-welding (hereinafter called the butt-welding temperature), bending the skelp into a tubular shape on molding rolls, butt-welding the opposite edges of the skelp to each other by means of butt-welding rolls, and then finishing the pipe by contraction rolling and other finishing processes. Such a method, however, is disadvantageous in that: the central portion of the skelp is heated as well as both the edges as it passes through the heating furnace, although the heating of the central portion is unnecessary and hence wasteful; both the edges of the skelp, which often are at somewhat different temperatures due to the construction of the heating furnace or differences of the thickness of the skelp itself, are butt-welded as they come from the furnace and the temperature difference causes a difference in deformation resistance which in turn makes the upset stress non-uniform; and the residual temperature difference between the seamed portion and the parent metal portion of the butt-welded pipe causes a deviation in the thickness in the vicinity of the seamed portion during the contraction process.

Heretofore, several remedies have been developed to overcome the above problems, but the results have not been completely effective. One method is disclosed in Japanese Patent Publication No. 14092/1968 and French Patent Application No. 936135. This method has been proposed to facilitate saving of energy, and in it the entire skelp is at first heated by passing it through the heating furnace at a temperature of about 1000° C., which is lower than the butt-welding temperature. Then an inductor for induction heating is used to heat only the opposite edges up to the butt-welding temperature, so that the central portion of skelp is kept at a lower temperature than the butt-welding temperature and in a range suitable for carrying out the bending, contraction rolling, etc., without hinderance, thus achieving the desired energy saving.

Thus, the equipment for the above prior art method therefore can keep the central portion of skelp at a lower temperature than both edges, but that is all that is done. The temperature of the two edges of the skelp is not adjustable so that upset stress cannot be made uniform, and thickness deviation during the contraction rolling process after butt-welding, cannot be kept from increasing. This is because of the inductor used for heating the edges of the skelp in the above prior art method. FIG. 21 is a schematic exterior view of such an inductor. The inductor comprises an elongated copper bar 101, a pair of aligned short copper bars 102 and 103 disposed parallel to the copper bar 101 and spaced from the bar 101 a distance slightly greater than the width of a skelp 10, pairs of arcuate thick copper bands 104 and 104' bridged across the upper and lower surfaces of the front end of copper bar 101 and copper bar 102 and across the upper and lower surfaces of the rear end of copper bar 101 and copper bar 103, and a pair of terminal tongues 105 and 106 provided on the opposed ends of copper bars 102 and 103. The inductor thus has the copper bars 101, 102 and 103 extending parallel to the edges El and Er of skelp 10 and opposed to the edge faces of the skelp, and the skelp 10 travels between the thick copper bands 104 at one end of the inductor and between the thick copper bands 104' at the other end. During the travel of the skelp, high frequency current is supplied through terminals 105 and 106 to thereby generate induced currents on the surface of the moving skelp 10 as it cuts the magnetic flux generated around the inductor, thus selectively heating the two edges El and Er of the skelp 10.

However, the two edges El and Er of the skelp 10 discharged from the heating furnace and entering the upstream end of the inductor are not always at the same temperature due to the construction of the heating furnace or variations in the thickness of the skelp itself. Thus, even when the edges of the skelp are heated uniformly by the inductor, the edges will almost always differ in temperature, usually by about 5° to 20° C. Furthermore, the path of the skelp moving through the inductor may change slightly due to the natural movements of the skelp, so that the dimensions of the intervals between the copper bars 101, 102 and 103, and the two edges El and Er may vary, which increases the temperature difference between the two edges, so variations in the upset stress increase, resulting in poor quality of the finished product. Even though the spaces between the copper bars 101, 102 and 103, and the two edges El and Er of the skelp 10 are made smaller to try to increase the heating efficiency, the amount the space can be reduced is limited because of the danger of deforming the skelp if the edges El and Er contact the copper bars 101, 102 and 103. Hence, the heating efficiency must remain rather low and the opportunity for energy saving is limited. Moreover, an inductor of a particular size can handle only a limited number of different widths of skelp, so that inductors of various sizes must be available if many different widths of skelp are to be handled. Further, the aforesaid temperature difference between the two edges El and Er of the skelp 10 when it is discharged from the heating furnace must often be compensated for, but the inductor having the above-described construcion is unable to carry out such compensation. Hence, the above-described method has disadvantages due to the limitations in the apparatus used to carry it out.

Problems also exist due to the butt-welding rolls which are commonly used. The roll gap between vertically disposed butt-welding rolls has usually been set to be constant. There are, however, variations in the width of the skelp, and the butt-welding rolls are usually slightly eccentric so as to create variations in the pressure applied to the edges of the skelp. The roll gap may be made smaller in an effort to eliminate portions of reduced strength along the seamed portion of the continuous butt-welded pipe, but this causes the problem that bead and thickness variation along the seamed portion increases. Furthermore, in the above method in which the skelp is bent and the edges of skelp are heated to a higher temperature than the central portion thereof and then butt-welded, because the temperature difference between the edges and the central portion of the skelp is produced for the purpose of saving thermal energy, the deformation resistance in the central portion is larger than where the entire skelp is heated to the butt-welding temperature, so that the constant roll gap increases the pressure between the butt edges to thereby promote production of the bead along the seamed portion of the finished pipe and increase the thickness variation in the vicinity of the seamed portion, thus causing variations of strength along the seamed portion.

OBJECT AND BRIEF SUMMARY OF THE INVENTION

The present invention has been proposed in order to overcome the above-described problems in the prior art methods and apparatus.

A main object of the invention is to provide an apparatus for continuous manufacture of butt-welded pipe which is capable of restraining the formation of a bead at the seamed portion and thereby reducing thickness deviation in the vicinity thereof, thus reducing variation of strength at the seamed portion and increasing the quality of the pipes.

Another object of the invention is to provide an apparatus for continuous manufacture of butt-welded pipe which operates with less energy consumption.

Still another object of the invention is to provide an apparatus for continuous manufacture of butt-welded pipe which does not damage the edges of the skelp even when a heater is brought close to the edges of the skelp for conserving energy.

A further object of the invention is to provide an apparatus for continuous manufacture of butt-welded pipe having a heater capable of raising the temperature of the two edges of the skelp to a uniform temperature for improving the quality of the finished product.

A still further object of the invention is to provide an apparatus for continuous manufacture of butt-welded pipe which is provided with butt-welding rolls capable of controlling the pressure load applied to the skelp so that it coincides with a desired preset value to thereby improve the quality of the finished product.

These and other objects and novel features of the invention will be more apparent from the following description taken together with the accompanying drawings, in which:

BRIEF DESCRIPTION OF THE DRAWINGS

FIG. 11 is a graph showing the relation between bead height and upset stress in a continuously butt-welded pipe;

FIG. 15(a) is a histogram showing the distribution of flatness values for a plurality of continuously butt-welded pipes produced by a conventional apparatus;

FIG. 15(b) is a histogram showing the distribution of flatness values for a plurality of continuously butt-welded pipes produced by a conventional apparatus;

FIG. 16 is a graph showing the results of measurements and showing the distribution of pipe thicknesses for various ways of controlling the cooling of the pipe in the apparatus according to the invention;

FIG. 17 is a cross-section of a pipe, showing the measuring positions used in measuring the values for the graph of FIG. 16;

FIG. 18 is a perspective view of a modified embodiment of the heater and a control system therefor;

DETAILED DESCRIPTION OF THE INVENTION

Figure 1:
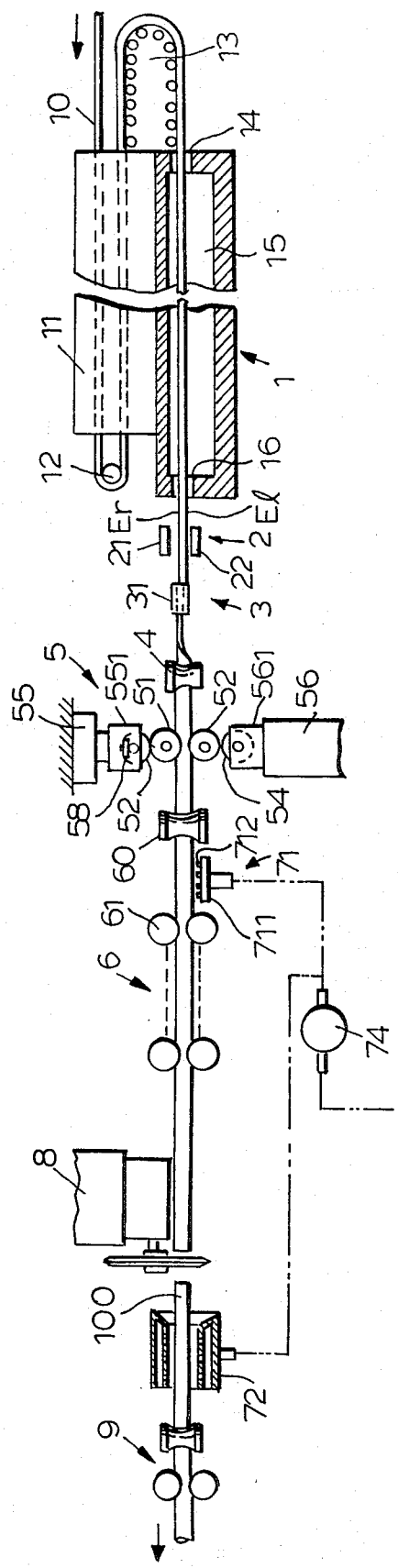
FIG. 1 is a schematic elevation view, partly in section, of an apparatus for continuous manufacture of butt-welded pipe according to the invention.

First, a general description of the construction of an apparatus for continuous manufacture of butt-welded pipe according to the invention will be given with reference to FIG. 1. In FIG. 1, reference numeral 10 designates the skelp. The skelp 10 is withdrawn from an uncoiler or the like (not shown) and the entire skelp is heated up to a temperature lower than the butt-welding temperature, 1150° to 1200° C., and preferably about 1200° C., by being passed through a heating furnace 1. Thereafter, the skelp is passed through a main heater 2 and a sub-heater 3. The main heater 2 heats only the two edges El and Er, i.e. an edge portion of a predetermined width, preferably about 10 mm, to a temperature at or near the butt-welding temperature, and the sub-heater 3 adjusts the temperature of the edges El and Er until they are equal and are at the butt-welding temperature. Next, the skelp is passed between bending rolls 4 and is bent in an O-like cross-sectional shape and the opposed edges El and Er are butt-welded by butt-welding rolls 5 to form the skelp into a pipe. Immediately thereafter, the seamed portion of the continuously butt-welded pipe is cooled by a cooling device 71 disposed between contraction rolls 60 upstream of the cooling device and a group of contraction rolls 6 downstream of the cooling device, so that any temperature difference between the seamed portion and remaining metal is reduced or eliminated. The pipe, thereafter, passes through the group of contraction rolls 6 and is cut to the desired length. The thus cut pipes 100 are completely cooled by a cooling device 72 and are finished by a finishing means such as a sizer 9 or the like.

Each component of the apparatus of the invention will be described in detail in the following description.

The heating furnace 1 itself is well-know and comprises an upper preheating zone 11 for preheating the skelp 10, a return drum 12 at the exit end of zone 11, and turnaround rolls 13 at the entrance end. Skelp 10 is moved in the direction of the arrow into the preheating zone 11 and passes around the return drum 12 and the turnaround rolls 13 and is directed into the heating zone 15 through an inlet 14. In the heating zone 15, the skelp is heated by a gas burner or the like as it moves through heating zone 15, and it is discharged from the heating zone 15 through an outlet 16. It is then guided sequentially through the main heater 1 and the sub-heater 3. When it is discharged from the heating furnace, the temperature of the skelp 10 is lower than the butt-welding temperature of about 1300° C., i.e. it is about 1180° C. at the central portion and about 1200° C. at the two edges El and Er. Such distribution of the temperature transversely of the skelp 10 is not limited to these values; they may be higher or lower than these values. If the temperature of the central portion of the skelp 10 exceeds the lower limit of the temperature range within which the temperatures are proper for the skelp to be bent and contracted without hinderance by the bending rolls 4 and the rolls of the contraction roll group 6, because the central portion of skelp 10 is heated somewhat as it passes through the main heater 2 and sub-heater 3, the temperature at the central portion of skelp 10 will approach the upper limit of the range of temperatures proper for bending and contraction rolling, and energy savings will be reduced. On the contrary, if the temperature of the central portion of the skelp is too low, this will increase the load on main heater 2, to bring the temperature of the central portion up to the desired levels to the extent that an increase in electric power consumption and the necessity to provide a large scale main heater 2 will result, which will not produce the desired economical advantages. Hence, it is desirable to control the heating furnace 1 so that the skelp 10, when it is discharged from the furnace, has the central portion heated up to the lower limit of the proper range of temperatures for bending and contraction rolling, or at least to a temperature lower than the above lower limit by an amount such that heating to the desired temperature can be carried out by the main heater 2 and sub-heater 3.

Figure 2:
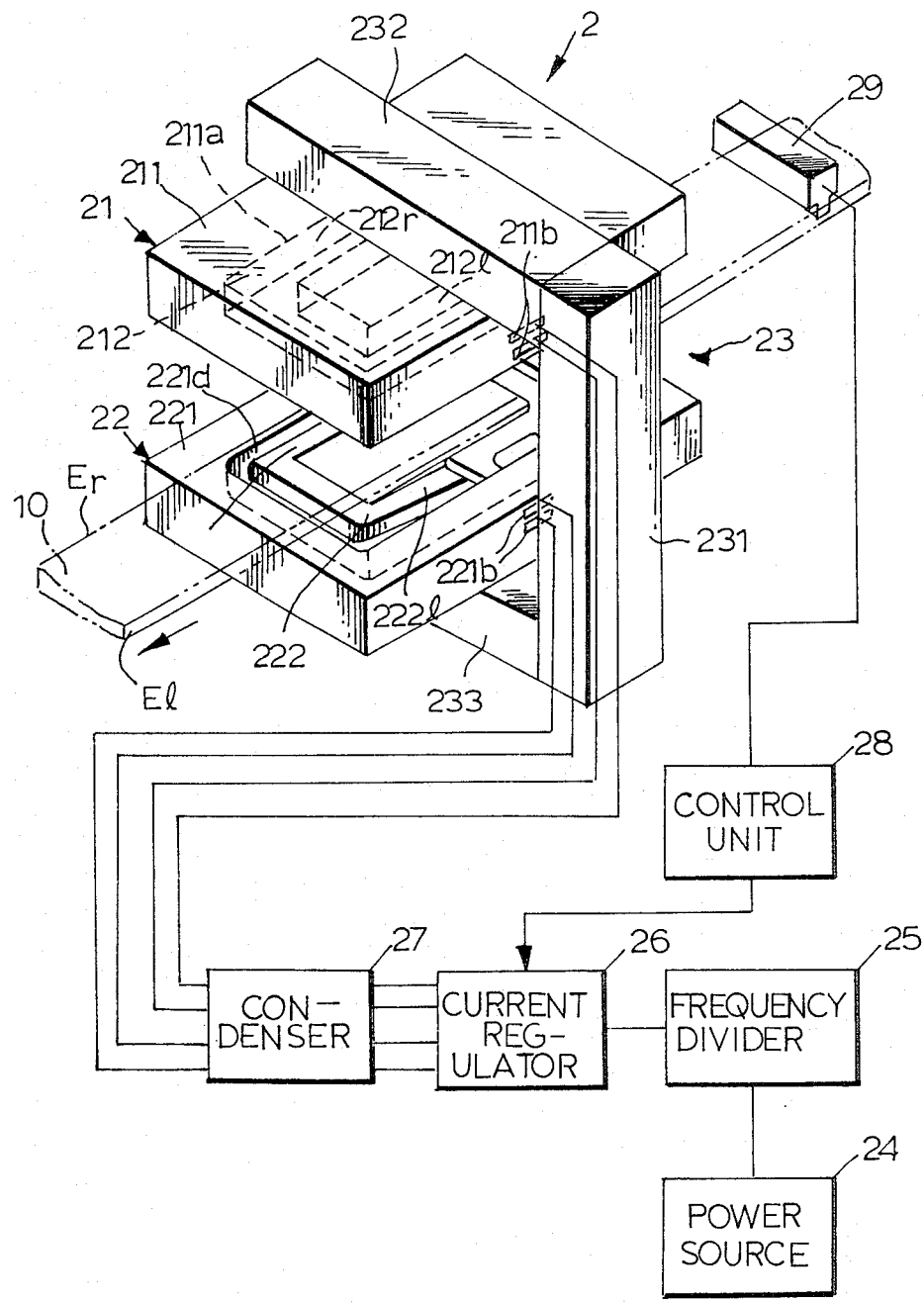
FIG. 2 is a perspective view, partly schematic, of a main heater and a control system for energizing it as used in the apparatus shown in FIG. 1.

In FIG. 2, which shows the main heater 2, reference numerals 21 and 22 designate upper and lower coils for induction heating. The coils 21 and 22 have rectangular cores 211 and 221 and coil bodies 212 and 222 fixed in grooves 211a and 221a in the lower surface of core 211 and the upper surface of core 221, respectively. A mounting frame 23 supports the coils 21 and 22 in vertically spaced opposite relationship to provide a space through which the skelp 10 can pass between the coils. The coil bodies are positioned with straight core portions 212l and 222l above and below the position of the left edge El of the skelp and the straight core portions 212r and 222r above and below the position of the right edge Er of the skelp, the core portions also extending in the same direction as the edges of the skelp 10. Cores 211 and 221 are formed of laminated silicon steel plates adhered to each other, and the surfaces thereof opposed to the coil bodies 212 and 222 are provided with heat insulators (not shown), e.g. ceramic plates. The groove 211a is formed in the lower surface of core 211 and groove 221a is formed in the upper surface of core 221, and the grooves are rectangular in shape with the longer sides parallel to the longer sides of the respective cores 211 and 221. The coil bodies 212 and 222 are long strips of copper extending in a rectangular pattern and are hollow to permit cooling liquid to flow therethrough. The strips are wound in layers within the grooves 211a and 221a and insulated from each other with varnish. The coil bodies 212 and 222 fit into grooves 211a and 221a and the ends extend to the exterior of the coils through bores 211b and 221b extending laterally through the cores 211 and 221, respectively.

The power supply system for the coil bodies 212 and 222 comprises a commercial power source 24, a frequency converter 25, a current regulator 26 and a power-factor improving condenser 27, individual electric currents at a desired frequency and current value set by the frequency converter 25 and current regulator 26 being fed through the power-factor improving condensor 27 to the respective coil bodies 212 and 222.

Reference numeral 28 designates a control unit for controlling the current flowing through the coil bodies 212 and 222. The control unit 28 is connected with a temperature sensor extending across the width of the skelp 10 upstream of the coils 21 and 22 with respect to the direction of movement of the skelp 10. The temperature distribution widthwise of the skelp 10 as detected by the temperature sensor 29 is fed into the control unit 28, and the control unit 28 determines a current value necessary for raising the temperature at both the edges El and Er up to the butt-welding temperature during the time the skelp 10 is passed between the coils 21 and 22, and control signals corresponding to this current value are fed to the current regulator 26 to cause the current regulator to feed individual coil energizing circuits which are of equal or different values to the respective coil bodies 212 and 222.

Figure 3:
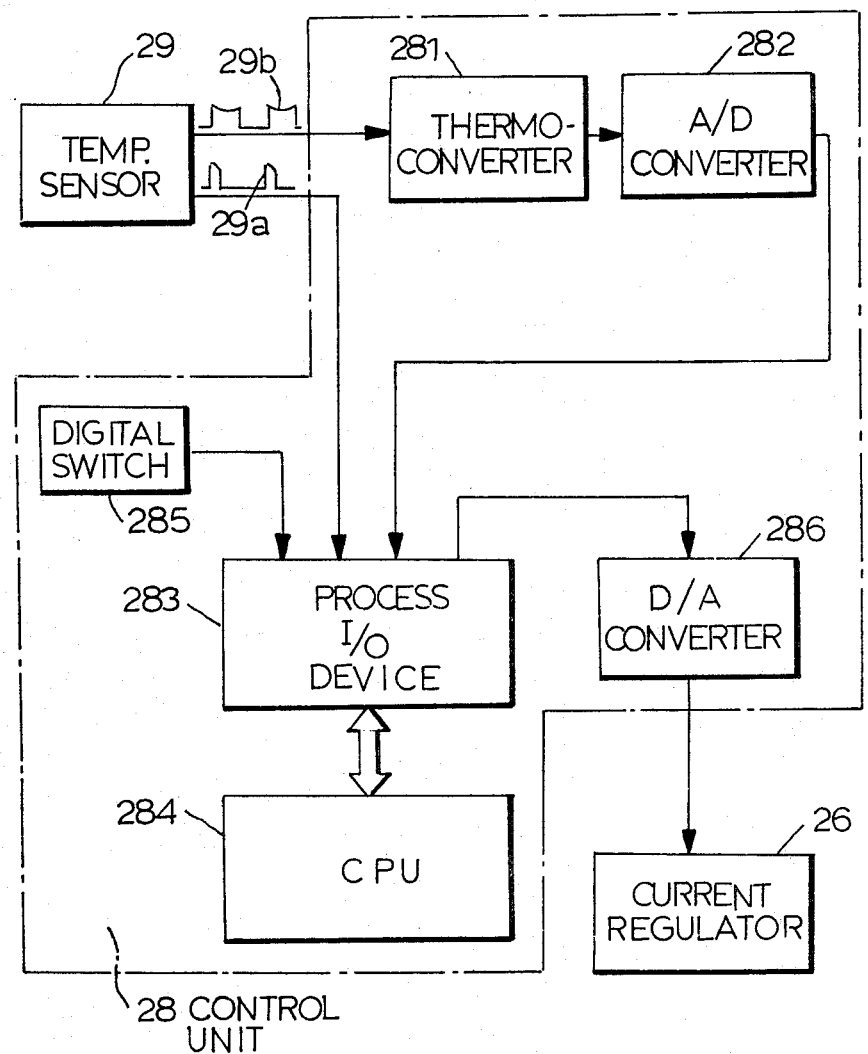
FIG. 3 is a block diagram of control unit 28.

FIG. 3, is a block diagram of the control unit 28, which is composed of thermo-converter 281, A/D (analog/digital) converter 282, process I/O (input/output) device 283, CPU (central processing unit) 284, digital switch 285 and D/A (digital/analog) converter 286. The temperature sensor 29 generates timing signal 29a, and temperature signal 29b which is obtained by a widthwise scan synchronizing with said timing signal 29a. The timing signal 29a is fed to CPU (for example, i SBC 80/204 made by INTEL) 284 through the process I/O device (for example, i SBC 508, 732 made by INTEL) 283. Temperature signal 29b is fed to thermo-converter 281, wherein the signal is amplified and the linearity thereof is connected, and the analog output of the converter 281 is converted to digital data by A/D converter 282. Said digital data is fed to CPU 284 through process I/O device 283.

Digital switch 285, composed of thumb wheel switch, is used for presetting the butt-welding temperature which should be the desired temperature at the edges El and Er, and the output is fed to CPU through process I/O device 283.

Figure 4:
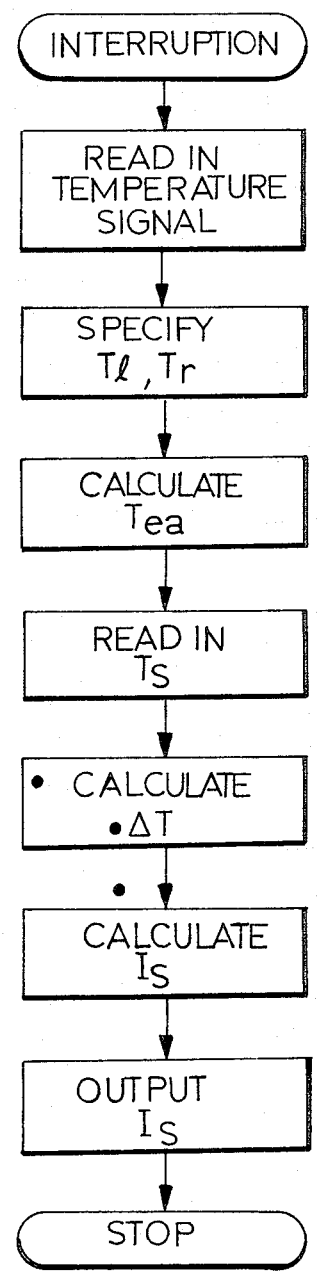
FIG. 4 is a diagrammatic flow chart explaining the operation by CPU 284.

CPU 284 begins an operation as shown in FIG. 4 with timer interruption. At first it reads in a temperature signal, specifies Tl and Tr (temperature of each edge El and Er, respectively), and calculates the average value Tea of the temperatures of both edges El, Er.

$$Tea = (Tl + Tr)/2$$

CPU 284, next, reads in the butt-welding temperature Ts being preset by digital switch 285, and calculates the difference $\Delta T$ between Ts and Tea.

$$\Delta T = Ts - Tea$$

After that, it calculates the current value Is which results in $\Delta T=0$, and transmits the data of Is to the current regulator 26 through D/A converter 286. For the calculation of Is, the following equation can be used, for example.

$Is = Is^{(-)} + A \times \Delta T$ $Is^{(-)}$: the value of Is that was calculated in preceding cycle A: proportional constant The control of the current can of course be carried out by changing and controlling the frequency of current flowing through coil bodies 212 and 222.

The mounting frame 23 comprises a vertical bar 231 and upper and lower horizontal arms 232 and 233 extending horizontally from the vertical bar 231. The coil 21 is fixed to the lower surface of the upper arm 232 and the coil 22 is fixed to the upper surface of the lower arm 233. The coil bodies 212 and 222 are opposed to each other in the vertical direction and face the space through which the skelp 10 passes. The details of the structure of the mounting frame 23 itself are not shown, but the structure is such as to cause coils 21 and 22 to face the space therebetween and be spaced from the surfaces of the skelp 10 at proper distances. Alternatively, for heating the edges El and Er up to the butt-welding temperatures, the coils 21 and/or 22 may be mounted on the frame 23 to move toward and away from each other, whereby the coils can be moved to change the electromagnetic connection between the coils and the edges of the skelp, for properly adjusting the temperature to which skelp is heated. Moreover, the coil bodies may be disposed opposite the side edge faces of the skelp 10, for example, similar to the sub-heaters 3 shown in FIG. 5. Furthermore, the lower arm 233, as shown in FIG. 18, may be mounted so as to be vertically rotated around the inner end of the arm 233 to thereby change the space between the coils 21 and 22 and the edges El and Er of the skelp 10, for adjusting the heating thereof.

The skelp 10, after passing through the main heater 2, has the edges El and Er heated up to or near the butt-welding temperature. The skelp is then guided into the sub-heater 3.

Figure 5:
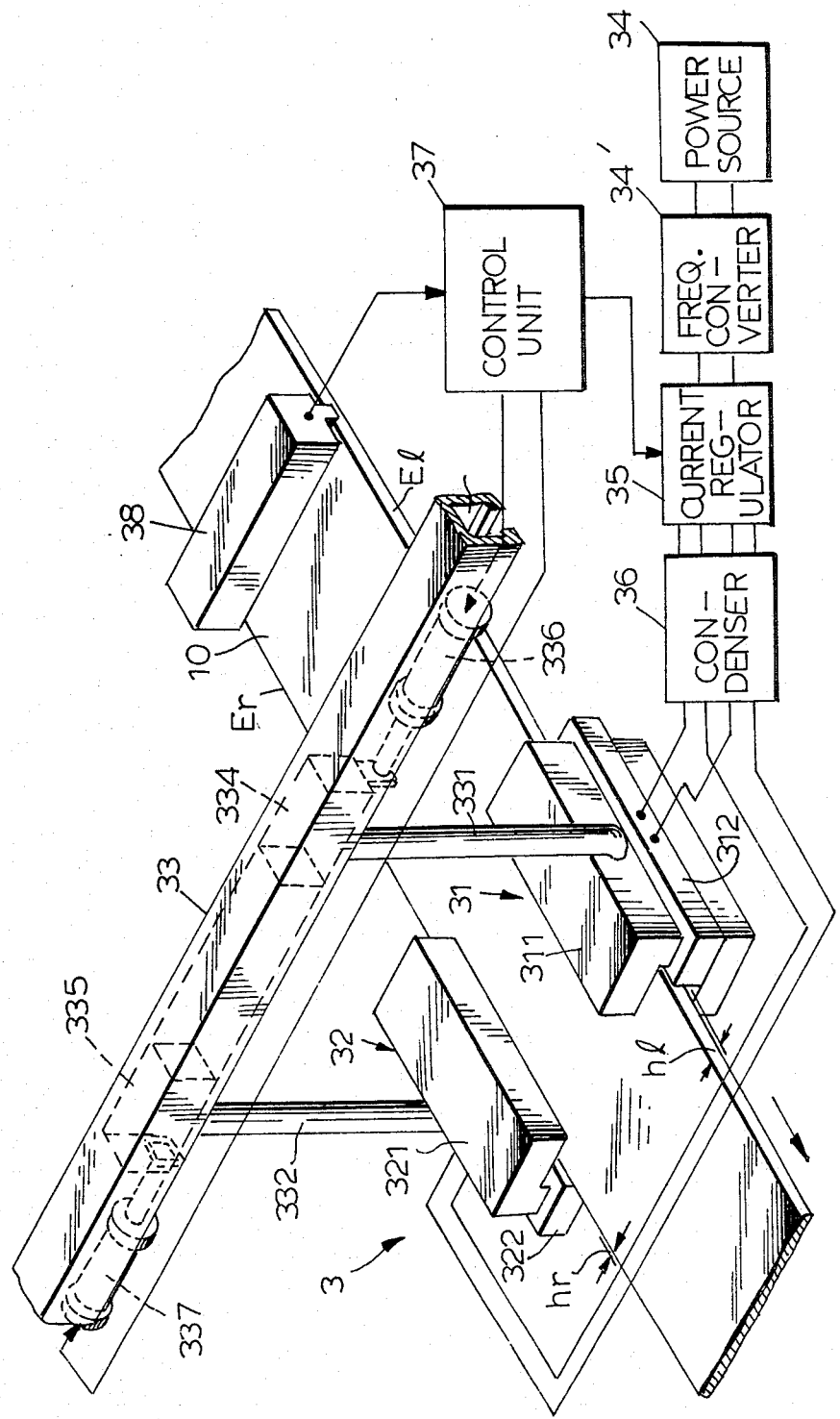
FIG. 5 is a perspective view, partly schematic, of a sub-heater and a control system for energizing it as used in the apparatus shown in FIG. 1.

FIG. 5 shows the sub-heater 3 and the drive means and control system therefor. Reference numerals 31 and 32 designate induction heating coils. The coils 31 and 32 are mounted on opposite sides of the path of the skelp 10 and comprise cores 311 and 321 having a U-shape cross-section transverse to the path of the skelp and coil bodies 312 and 322 constituted by horizontally wound long strips of hollow copper respectively. The power supply system for the respective coil bodies 312 and 322 comprises a commercial power source 34, a frequency converter 34', and a current regulator 35 and a power-factor improving condenser 36 for supplying separate currents to the individual coil bodies 312 and 322.

A support beam 33 extends transversely of the path of the skelp and support rods 331 and 332 depend from the support beam and have the respective coils mounted on the lower ends with the coil bodies 312 and 322 facing the side edge surfaces of the skelp edges El and Er, with the edges El and Er between the vertically spaced opposed portions of the respective cores 311 and 321.

The support beam 33 extends horizontally and perpendicularly to the direction of movement of the skelp 10 and is positioned above the path thereof. A guide groove 333 extends lengthwise of the support beam 33 and opens out of the lower surface thereof and houses sliders 334 and 335 which are supported by flanges extending inwardly from both sides of the guide groove 333. The support rods 331 and 332 are mounted on the lower surfaces of the sliders. To the outwardly facing end faces of the sliders 334 and 335 are connected piston-cylinder devices 336 and 337 which in turn are mounted on the lower surface of support beam 33. The outer ends of the piston rods of the piston-cylinder devices are connected to the sliders 334 and 335 respectively, for moving the sliders 334 and 335 toward or away from each other, so that the spaces between the coil bodies 312 and 322 and the edges El and Er of the skelp 10 can be adjusted by changing the horizontal distances hl and hr.

A control unit 37 controls current flow through the coil bodies 312 and 322, drives the piston-cylinder devices 336 and 337 in response to the temperatures distribution sensed by a temperature sensor 38 positioned upstream of the coils 31 and 32 relative to the direction of movement of the skelp and extending across the width of the skelp 10. The control unit 37 determines a temperature difference on the basis of the temperature distribution across the skelp 10, especially the temperature of the edges El and Er, as detected by the temperature sensor 38, and generates a control signal and feeds it into the current regulator 35. In response thereto, the current regulator changes the values of the currents flowing to the respective coil bodies 312 and 322 so as to eliminate the temperature difference. When said current value exceeds the control range of the current regulator 35, the piston-cylinder device 336 (or 337) is driven and it moves the slider 334 (or 335) to roughly set the horizontal distances hl (or hr) between the coil bodies 312 (or 322) and the edges El (or Er) of skelp 10. Thereafter, the current which flows through the coil bodies 312 and 322 is finely-adjusted by the regulator 35 and both the edges El and Er are heated to the optimum butt-welding temperature within the range of butt-welding temperatures.

Figure 6:
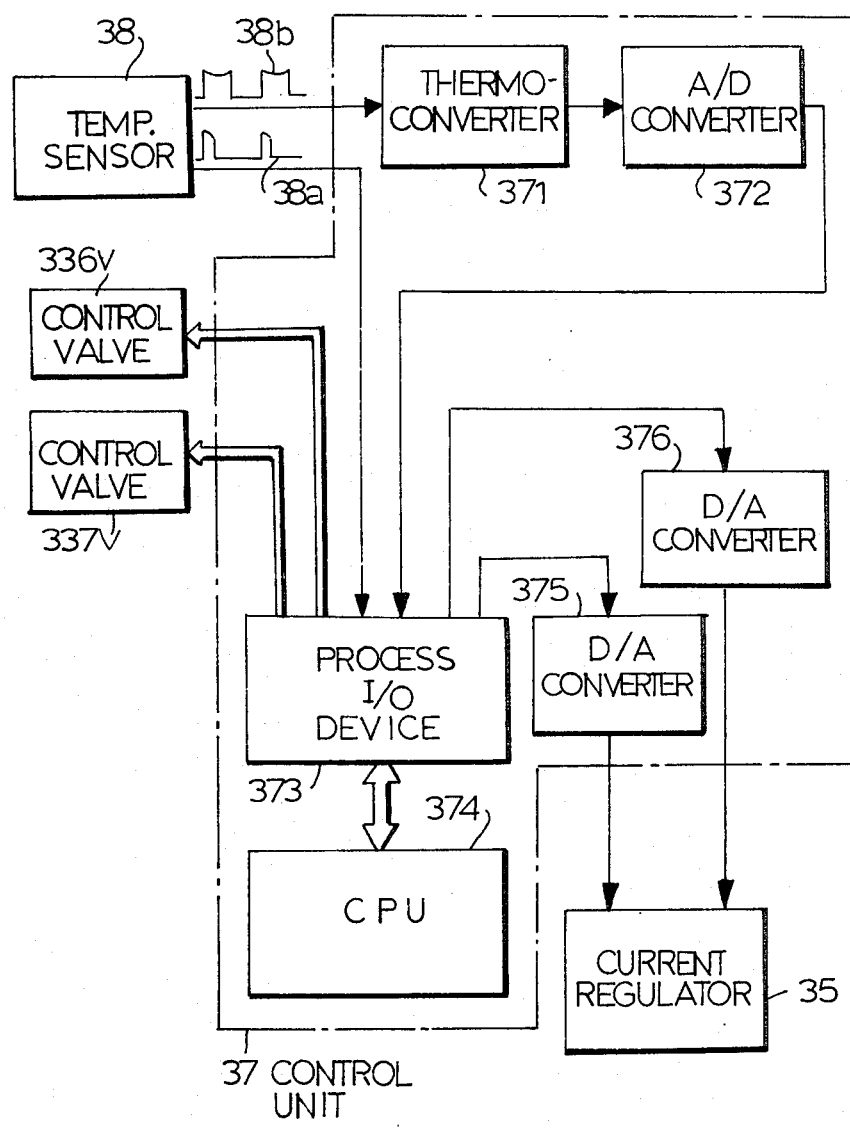
FIG. 6 is a block diagram of control unit 37.

FIG. 6 is a block diagram of the control unit 37, which is composed of thermo-converter 371, A/D converter 372, process I/O device 373 (for example, iSBC 508, 732 made by INTEL), CPU 374 (for example, iSBC 80/204 made by INTEL) and D/A converters 375, 376.

Like CPU 284, CPU 374 reads in the timing signal 38a and temperature signal 38b which the temperature sensor 38 generates, and it feeds control signals to the current regulator 35 and the control valves 336v & 337v which are located in the air circuits of piston cylinder devices 336 & 337 respectively.

Figure 7:
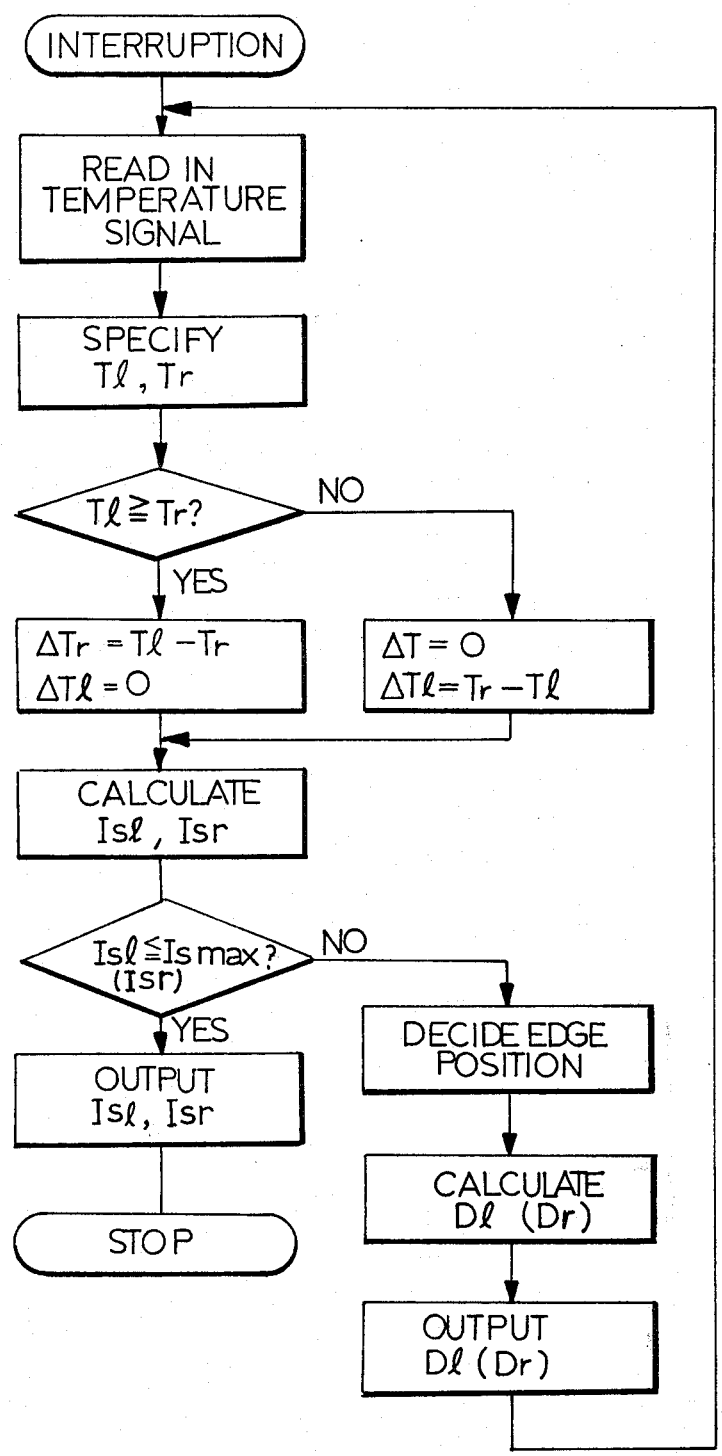
FIG. 7 is a diagrammatic flow chart explaining the operation by CPU 374.

CPU 284 begins an operation as shown in FIG. 7 with timer interruption. At first it reads in a temperature signal, specifies Tl and Tr, and compares them. After that, it calculates a temperature to which the edges must be raised $\Delta Tl$ (at the edge El), $\Delta Tr$ (at the edge Er) for eliminating the deviation of Tl and Tr.

When
 $Tl \geq Tr$;
  $\Delta Tl = 0$
  $\Delta Tr = Tl - Tr$
When
 $Tl < Tr$;
  $\Delta Tl = Tr - Tl$
  $\Delta Tr = 0$ Then, CPU 284 calculates the current values Isl and Isr which should be supplied for the coils 31 and 32 respectively. For this calculation, the following equations can be used, for example.

$Isl = Isl^{(-)} + B \times \Delta Tl$ $Isr = Isr^{(-)} + C \times \Delta Tr$ $Isl^{(-)}, Isr^{(-)}$: the values of Isl and Isr that were calculated in preceding cycle respectively B, C: proportional constant In the next step, Isl and Isr are compared with Is max, which is the maximum value of the controllable range of the current regulator.

When Isl (Isr)≦Is max, the data of Isl and Isr are transmitted to the current regulator 35. On the contrary, it decides the positions of edges El and Er by the use of the pattern of temperature signal 38b, for example, and calculates Sl (or Sr) and transmits it to the solenoid of the control valve 336v (or 337v). Sl (or Sr) is the time during which said solenoid should be magnetized, and corresponds to the length hl (or hr) to be adjusted.

Thus, the horizontal distances hl and hr are changed to change the strengh of the electromagnetic connection between the coil 31 and the edge El and between the coil 32 and the edge Er, thereby enabling the heating and temperature of the respective edges to be separately controlled.

Alternatively, only adjustment of the horizontal distances hl and hr can be carried out to make the temperature of both the edges El and Er the same. Also, one or the other of the piston-cylinder devices 336 and 337 may be omitted and one of the lengths hl or hr can be fixed and the other made variable.

Furthermore, the main heater 2 may be omitted and only the sub-heater 3 or the heater shown in FIG. 18 used for heating the edges El and Er to the desired equal temperature.

Still further, a further temperature sensor (not shown) can be placed downstream from the sub-heater 3 for measuring the temperature of the skelp 10 after it has been heated by the sub-heater 3 to detect any temperature difference between edges El and Er. In order to eliminate any such temperature difference, a feed-back circuit to the control unit may be provided for adjusting the locations of coils 31 and 32 to thereby increase accuracy of the temperature control for the edges El and Er.

Figure 8:
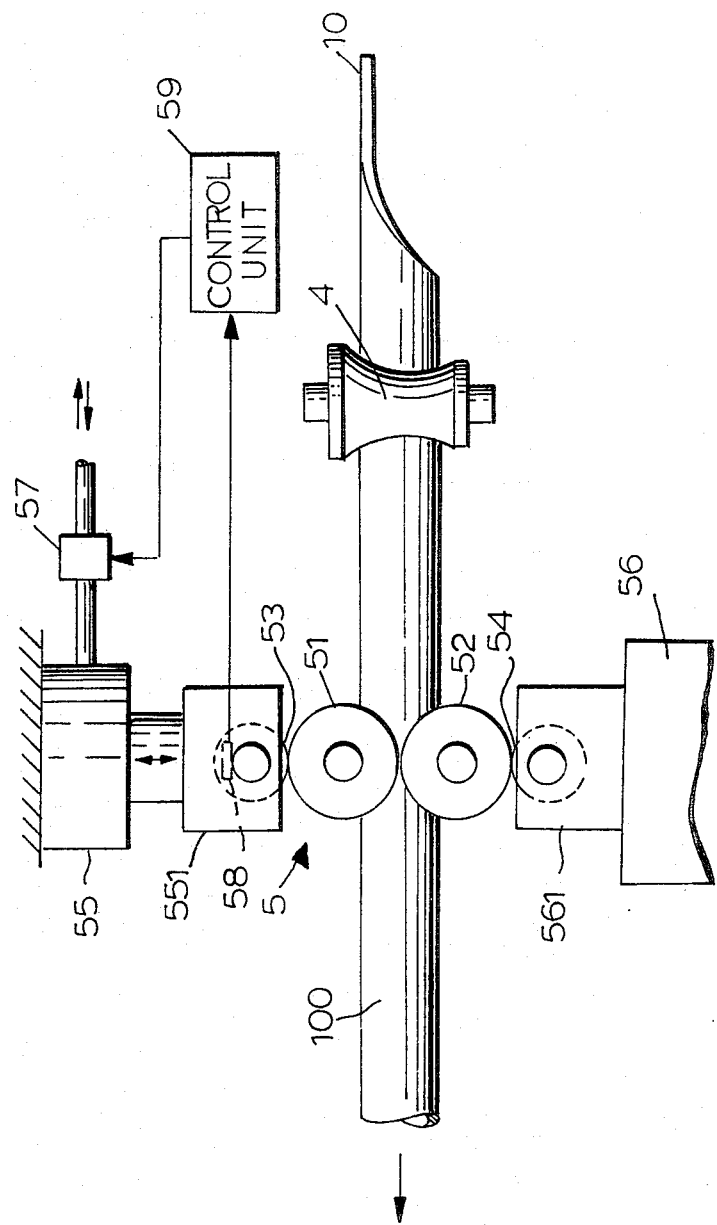
FIG. 8 is an elevation view of butt-welding rolls and a control system therefor used in the apparatus of FIG. 1.

The skelp 10 with both edges El and Er heated to the proper butt-welding temperature is then, as shown in FIG. 1, passed through bending rolls 4 for bending the edges downwardly relative to the central portion, thus forming the skelp into an O-like cross-sectional shape. Then, the skelp is passed through the butt-welding rolls 5 for butt-welding the edges El and Er to each other to form a pipe. As shown in FIG. 8, the butt-welding rolls 5 are constituted by work rolls 51 and 52 which have caliber grooves of approximately the same semicircular profile and have flanges at both ends which have the proper width. Above the work roll 51 and below the work roll 52 are back-up rolls 53 and 54 abutting the flanges of the work rolls respectively. The lower back-up roll 54 has the ends of the shaft rotatably supported in a support frame 561 on a stand 56. The upper back-up roll 53 has the ends of the shaft rotatably supported in a frame 551, into and out of which a pressure-load adjusting device 55 is movable, and is vertically movable a small distance. The pressure-load adjusting device 55 is controlled by an oil-pressure control valve 57 for being vertically moved, so that the rolling pressure of the work rolls 51 and 52 on the skelp 10 for bending it into a tubular shape can be adjusted to thereby make it possible to butt-weld the opposed edges El and Er at a desired pressure for welding. The rolling pressure of work rolls 51 and 52 on the outer periphery of skelp 10, in other words, the pressure-load, is detected by a load cell 58 provided at the bearings for the shaft of back-up roll 53 carried by the support frame 551. A control unit 59 is provided which is connected to the load cell 58 and adjusts the oil-pressure control valve 57 in response to the pressure-load adjusting device 55. The pressure-load detected by the load cell 58, when fed into the control 59, is compared with the preset reference pressure-load for properly abutting the edges El and Er. Opening of the oil-pressure control valve 57 for eliminating any difference between the detected and predetermined loads is calculated, and the oil-pressure control valve 57 is supplied with a control signal for increasing or decreasing the pressure-load. The reference pressure-load supplied to the skelp 10 by work rolls 51 and 52 is within a range of pressures which insure proper welding of the edges El and Er, and moreover the value is selected so that the amount of upset is uniform and any thickness increase around the seamed portion, or the bead height, is reduced so that it is kept within a constant range.

Figure 9:
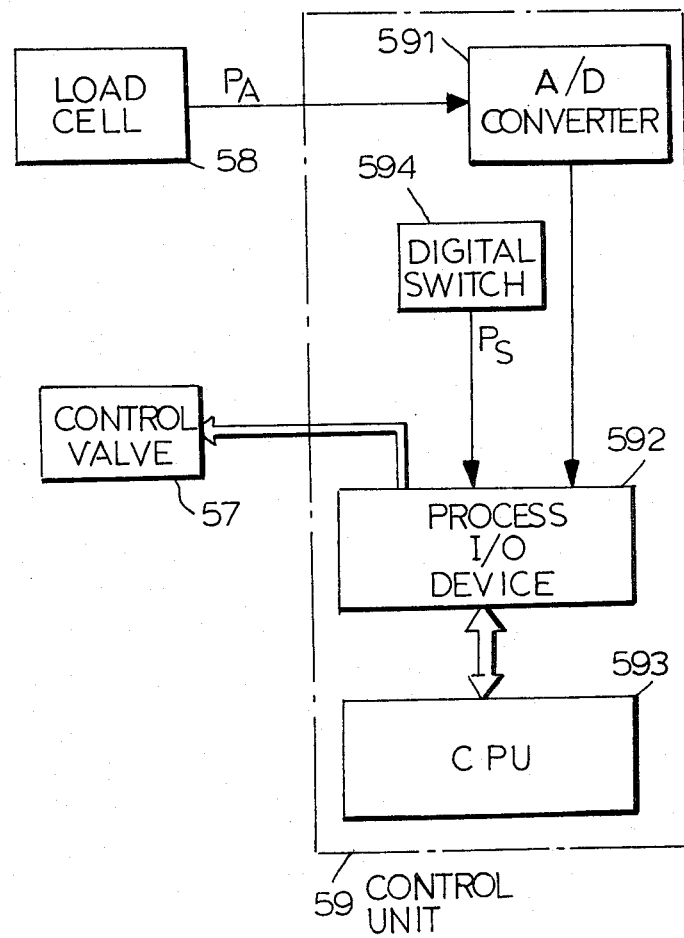
FIG. 9 is a block diagram of control unit 59.

FIG. 9 is a block diagram of the control unit 59, which is composed of A/D converter 591, process I/O device 592 (for example iSBC 508, 732 made by INTEL), CPU 593 (for example, iSBC 80/204 made by INTEL) and digital switch 594.

Figure 10:
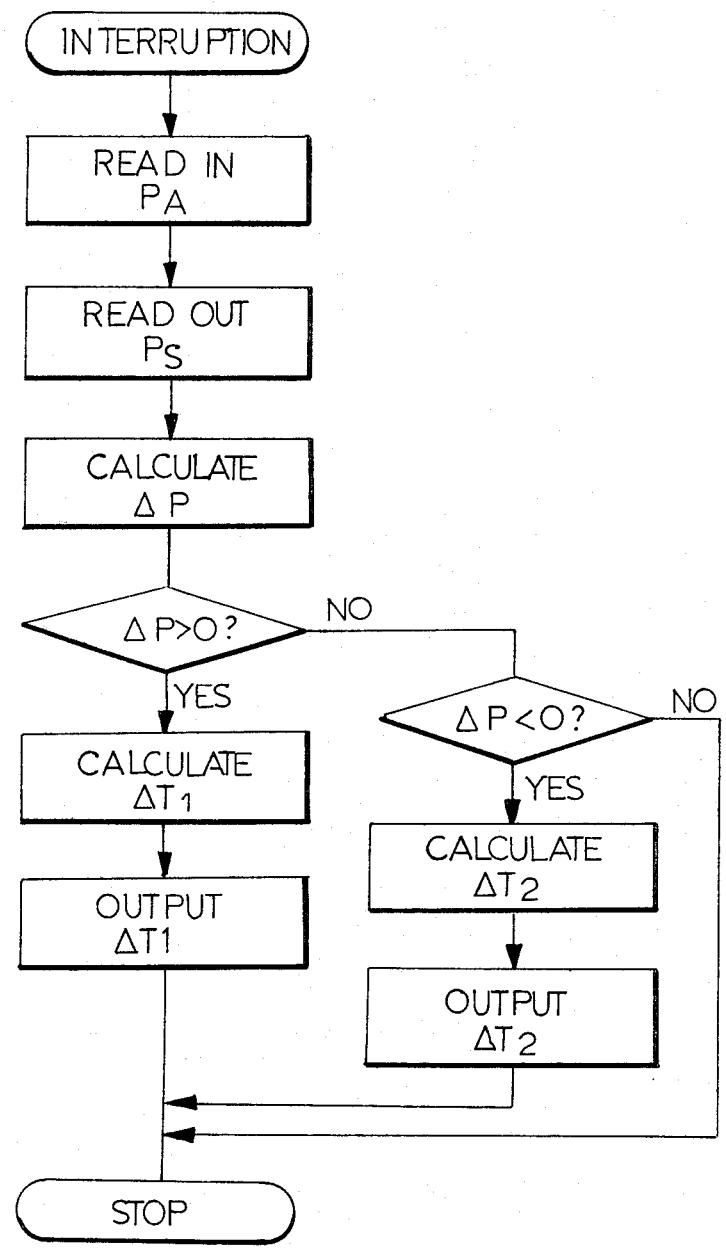
FIG. 10 is a diagrammatic flow chart explaining the operation by CPU 593.

CPU 593 begins an operation as shown in FIG. 10 with timer interruption. At first, it reads in pressure load PA, which is detected by the load cell 58, through A/D converter 591 and process I/O device 592, and reads in the preset reference pressure-load Ps from the digital switch 594. It calculates the difference $\Delta P$ between Ps and PA.

$\Delta P = Ps - PA$

After that, the difference $\Delta P$ is compared with zero.

When $\Delta P > 0$, CPU 593 calculates the time $\Delta T1$, and when $\Delta P < 0$, it calculates the time $\Delta T2$ by the following equations, and transmits them to the control valve 57.

$\Delta T1 = D \ \Delta P = E$ $\Delta T2F \ \Delta P = G$

D, E, F, G: constants

When $\Delta P > 0$, the control valve 57 is opend to supply oil to the pressure-load adjusting device 55, and when $\Delta P < 0$, the control valve 57 is opened to release the oil pressure in the adjusting device 55. $\Delta T1$ and $\Delta T2$ are the times needed to open the control valve 57 in order to make $\Delta P = 0$.

The reason why the pressure-load controlled by the butt-welding rolls 5 limits the height of the bead and the thickness increase around the seamed portion, will now be explained.

FIG. 11 shows the results of experiments carried out for obtaining the relation between the height of the bead and upset stress, in which a skelp 320 mm wide and 3.2 mm thick was first heated so that both edge portions 10 mm wide were heated to a higher temperature than the central portion, and the skelp was bent and butt-welded with an amount of upset of 10 mm, whereby a continuously butt-welded pipe having an outside diameter of 101.9 mm was produced from the butt-welding rolls. The graph shows the upset stress (kg/cm$^2$) along the ordinate and the height of the bead (mm) at the seamed portion along the abscissa. Marks O, □, △ and X in the graph, represent the relation between the upset stress and the bead height corresponding to temperature differences between the edge portions and the central portion of 50°, 100°, 150°, and 300° C. when the temperature of the central portion was 1300° C. and the temperatures of the edge portions were 1250°, 1200°, 1150°, and 1000° C. The solid line shows relation between the upset stress and the bead height when both edges were at a temperature of 1300° C. and the central portion was at 1000° C. As seen from the graph, the greater the temperature difference between the edges and the central portion, the larger the upset stress and bead height for a given skelp, and when the temperature difference is constant, the bead height becomes larger nearly in proportion to the increase in the upset stress. In addition, the dot-dash line shows the lower limit of upset stress necessary for ensuring adequate strength of the butt-welding at the seamed portion.

On the other hand, for a given temperature of the skelp, the upset stress is principally related to the pressure load at the butt-welding rolls. Both the height of bead and increase in thickness around the seamed portion change in association with each other due to the temperature at both edges of the skelp and the upset stress. In brief, where the temperature of the edges of the skelp upstream of the butt-welding rolls is closely controlled, as by the apparatus of the invention, the pressure load at the butt-welding rolls can be controlled to achieve a desired upset stress and bead height value according to the relation shown in FIG. 11, thereby making possible desirable reduction of bead height and thickness increase around the seamed portion. A further effect is to reduce variations in the strength of the seamed portion of the pipe.

Referring again to FIG. 1, the pipe 100 butt-welded by rolls 5 passes through contraction rolls 60 and a group of contraction rolls 6 and has the seamed portion cooled by means of a cooling device 71 disposed between the contraction roll 60 and the foremost contraction roll 61 in the roll group 6 and facing the seamed portion of pipe 100.

Figure 12:
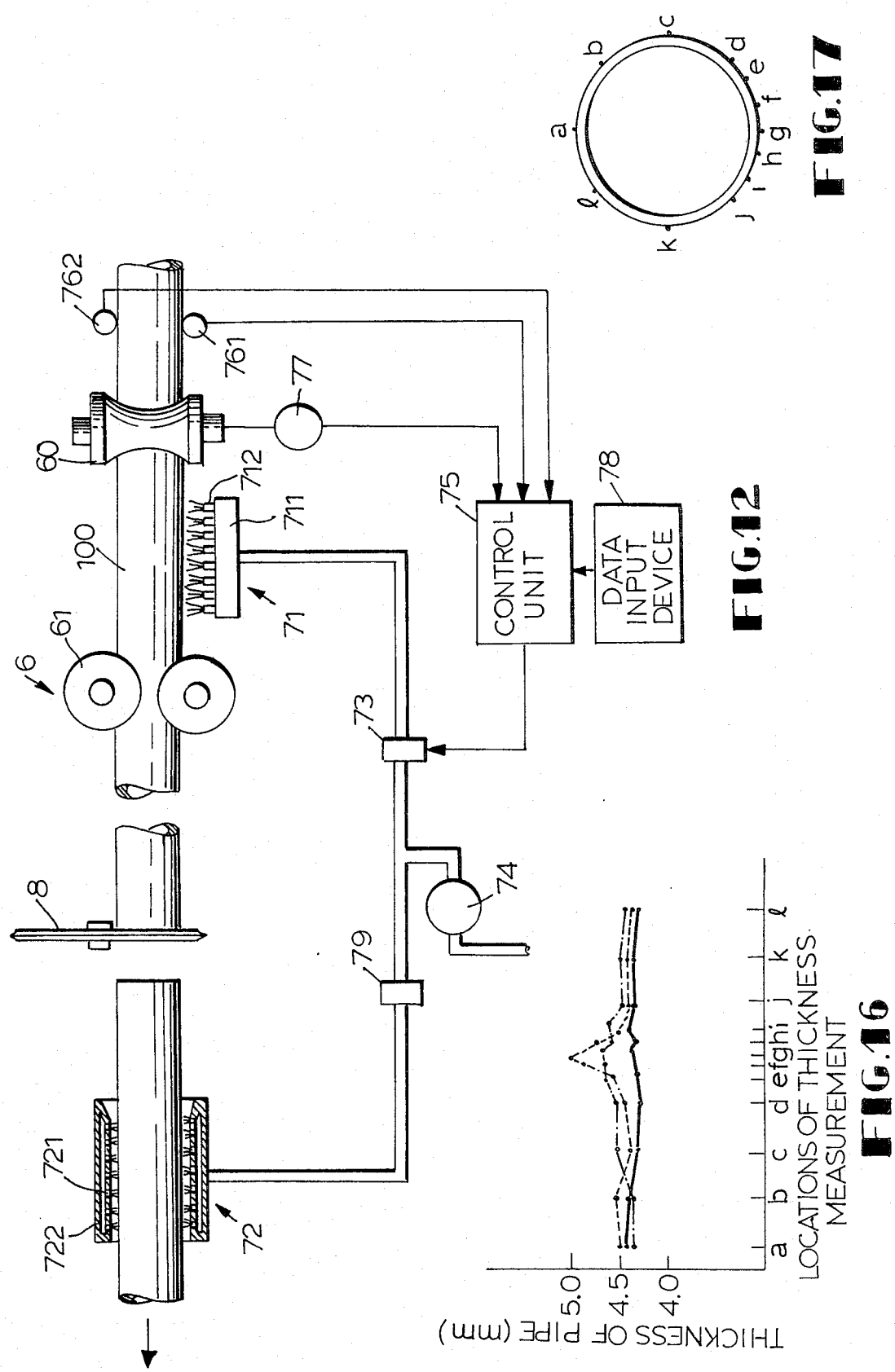
FIG. 12 is a schematic elevation view, partly in section, of a cooling device and a control system therefor used in the apparatus of FIG. 1.

The cooling device 71 has a number of spray orifices 712 in the upper surface of a hollow box 711 opposed to the seamed portion of pipe 100, the box 711 having a length in the direction of movement of the pipe 100 for achieving the desired amount of cooling. Referring to FIG. 12, there are shown the cooling device 71 and the cooling device 72 downstream therefrom and described more fully hereinafter. A pump 74 is connected to the cooling device 71 by way of a control valve 73, so that water can be selectively supplied from the pump 74 and directed against the seamed portion through the spray orifice 712. A control unit 75 for controlling the control valve 73 is connected with temperature sensors 761 and 762 facing the seamed portion of the pipe 100 and the remaining metal portion of the pipe at a position upstream relative to the moving direction of pipe 100 of the cooling device 71 and a pulse generator 77 is connected to the contraction rolls 60. The control unit 75 calculates from the temperature of the seamed portion and the temperature of the remaining metal as detected by the sensors 761 and 762, the speed of movement of the pipe 100 detected by the pulse generator 77, and the outer diameter and thickness of pipe 100 supplied from a data input device 78 the amount of water necessary for reducing the temperature of the seamed portion down to a temperature equal to that of the remaining metal portion of the pipe. Then the control unit 75 supplies a signal to the control valve 73 to cause the valve to open to supply the calculated amount of water to be sprayed onto the seamed portion of pipe 100.

Figure 13:
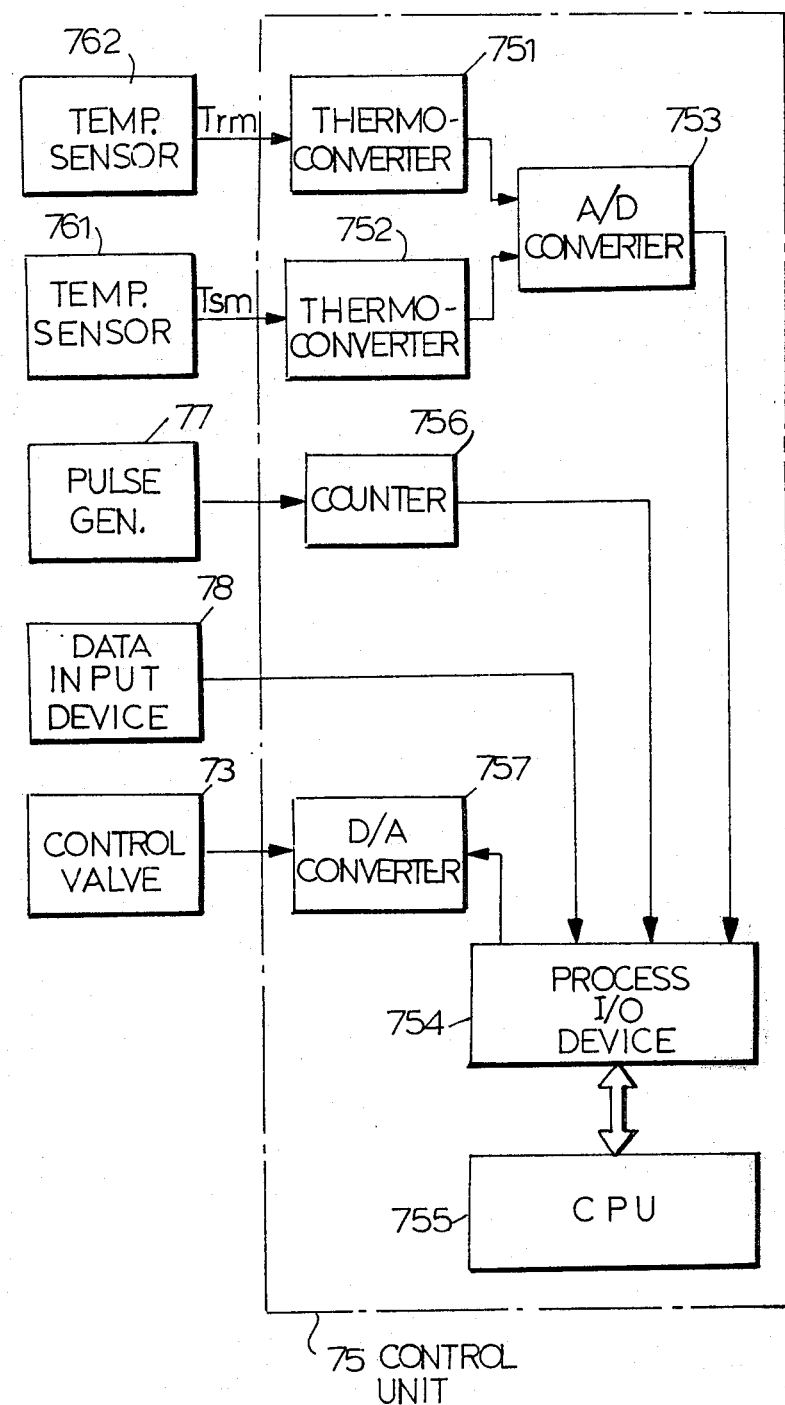
FIG. 13 is a block diagram of control unit 75.

FIG. 13 is a block diagram of the control unit 75, which is composed of thermo-converters 751, 752, A/D converter 753, process I/O device 754 (ditto), CPU 755 (ditto), counter 756 and D/A converter. The counter 756 counts the pulses fed by the pulse generator 77.

Figure 14:
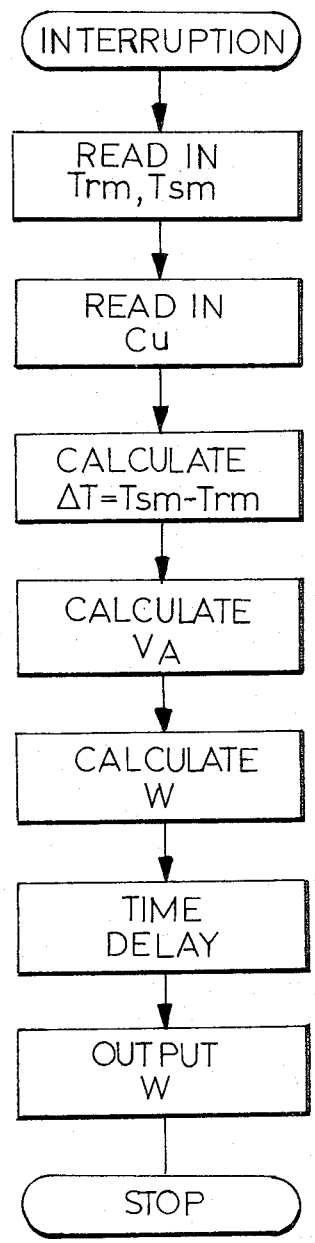
FIG. 14 is a diagrammatic flow chart explaining the operation by CPU 755.

As shown in FIG. 14, CPU 755 reads in Tsm (temperature of the seamed portion) and Trm (that of the remaining metal portion) from the temperature sensors 761 and 762 respectively, and reads in Cu (the count up value of the counter 756). Then, CPU 755 calculates the difference $\Delta Tm$ between Tsm and Trm by the following equation, $$\Delta Tm = Tsm - Trm$$

and calculates the speed VA of the pipe 100 by following equation, for example.

$$VA = K1(Cu - Cu^{(-)})$$

$Cu^{(-)}$: the value of Cu that was read in at the preceding cycle

K1: proportional constant

After that, the amount of water W, which should be sprayed from the cooling device 71, is calculated by the following equation.

$$W = W0 + K2 \times \Delta Tm$$

W0: constant amount of water which is determined by the dimensions of pipe 100

K2: variable value depending on VA

CPU 755 transmits the data of W for adjusting the control valve 73 through D/A converter 757 after a certain delay time, which corresponds to the distance between the sensors 761, 762 and the cooling device 71 and determined from the distance and said speed VA.

Alternatively, the cooling device 71 may be positioned just downstream of the butt-welding rolls 5 or intermediate the rolls of the roll group 6. For example, a butt-welded pipe 100 having an outer diameter of 60.5 mm and a thickness of 3.8 mm and moving at a speed of 85 m/min. and having a temperature of about 1320° C. at the seamed portion and about 1180° C. at the remaining metal portion, is sprayed with water at 20° C. and at a pressure of more than 5 kg/cm² at a rate of about 150 l/min. to cool the seamed portion to the temperature of the remaining metal portion.

The pipe 100 is moved through the contraction rolls 60 and the contraction roll group 6 for being finished and is delivered to the rotary hot saw 8 for being cut therewith into desired axial lengths, the rotary hot saw 8 being a conventional saw. The cut pipe 100 is then passed through the other cooling device 72 and is abruptly quenched therein down to about 900° C. The cooling device 72 comprises an inner cylinder 721 having in its wall a number of spray orifices oriented radially inwardly of cylinder 721, and an outer cylinder 722 coaxial therewith, the inner cylinder 721 and outer cylinder 722 being connected at the downstream ends thereof by an end plate, the inner cylinder 721 diverging outwardly at the upstream end and being welded to the inner periphery of the outer cylinder 722. The outer cylinder 722 is connected to the discharge port of the pump 74 for the cooling device 71 through a control valve 79, whereby water from the pump 74 is sprayed radially inwardly through spray orifices in the inner cylinder 721.

The cut pipe 100 is quenched down to about 900° C. during its passage through the inner cylinder 721 of the cooling device 72, and passes through the sizer 9 for delivery to other finishing apparatus (not shown).

In the apparatus of the invention, constructed as described above, the skelp 10 is heated to 1200° C., which is lower than the butt-welding temperature, during its passage through the heating furnace 1 and then passes through the main heater 2. The temperature sensor 29 is attached to control unit 28 for the main heater 2 detects temperature distribution across the width of the skelp 10 just after it is discharged from the heating funcace 1 and supplies this information to the control unit 28. The control unit 28, on the basis of the temperature distribution, detects the difference between the temperatures of the two edges El and Er and the preset butt-welding temperature and determines current values necessary for raising the temperature of the respective edges El and Er to the butt-welding temperature. The current regulator 26 receives control signals from the control unit 28 and provides separate appropriate currents to the coil bodies 212 and 222 for heating the edges El and Er to the butt-welding temperature. Hence, the edges El and Er are heated from about 1200° C., the temperature at the time of being discharged from the heating furnace, to about 1300° C., the butt-welding temperature, and then the skelp is introduced into the sub-heater 3. The temperature of the edges El and Er is detected by the temperature sensor 38 provided just upstream of the sub-heater 3, and if both the edges are heated up to the butt-welding temperature and there is no temperature difference, the control unit 37 does not energize the coil bodies 312 and 322 in coils 31 and 32, and the skelp 10 simply passes through the sub-heater without being further heated. When a temperature difference between the edges is detected, the control unit 37 calculates the value of the currents for the respective coil bodies 312 and 322 which are required to eliminate the difference and generates appropriate control signals. If the current value obtained from the control unit 37 exceeds the capacity of the current regulator 35, the piston-cylinder devices 336 and/or 337 are supplied with the necessary signal to move the support rods 331 and/or 332 perpendicularly to the direction of movement of the skelp 10, thereby adjusting horizontal space between the coil bodies 312 and 322 and the edges El and Er, and also the current values are further adjusted by the control unit 37 and the current regulator 35. As a result, the temperature of the edges El and Er is adjusted to the same butt-welding temperature.

The skelp 10 which leaves the sub-heater 3 passes through the bending rolls 4 with the edges El and Er heated uniformly to the predetermined butt-welding temperature, and the skelp is bent into an O-like cross-sectional shape and then passes through the butt-welding rolls 5. The load cell 58 at the bearing of one butt-welding roll 5 detects the pressure load of butt-welding roll 5 with respect to the outer periphery of the bent skelp 10, and supplies it to the control unit 59, and the detected pressure load is compared with the predetermined desired pressure load, and control signal is then sent from the control unit 59 to the control valve 57 to actuate the pressure load adjusting device 55 for making the pressure load at the butt-welding rolls 5 coincide with the predetermined pressure load. Thus the skelp 10 is subjected to the proper pressure from the butt-welding rolls 5 and the opposite edges El and Er are butt-welded at a constant pressure. The butt-welding of edges El and Er at a constant pressure keeps the amount of upset to a minimum and in turn keeps the thickness increase at the bead portion and thereabout caused by butt-welding to a minimum. The equal temperature and uniform deformation resistance at the edges El and Er also assist in achieving the result, whereby external deformation, such as variations in the outer diameter of the pipe 100, and variations in the strength at the seamed portion are prevented.

After leaving the butt-welding rolls 5, the temperature of the pipe 100 at the seamed portion is detected by the temperature sensor 761 and the temperature of the remaining metal portion is detected by the sensor 762 and the results are fed into the control unit 75. The control unit 75 compares temperatures of both portions and calculates the amount of water necessary to reduce the temperature of the seamed portion down to that of the remaining metal portion on the basis of the temperature difference, the speed of movement of the pipe 100 as supplied from the pulse generator 77, and the outer diameter and thickness of the pipe 100 as supplied from the data input device 78. The control valve 73 is supplied with a control signal from the control unit 75 for supplying the amount of water necessary for spraying the seamed portion. Thus, the pipe, after leaving the butt-welding rolls 5, has the temperature of the seamed portion reduced to the temperature of the remaining metal portion or thereabout, and then passes through the contracting roll group 6 to be extended. As a result, even when the pipe is subjected to contraction and extension by the roll group 6 while passing therethrough, the thickness of the seamed portion and the portion thereabout is not increased.

The advantages of the apparatus of the invention will now be described.

Table 1 shows data from comparative test results, and shows the defective bead production percentage (the ratio of the number of pipes having defective beads to the total number of pipes produced) when producing pipes of the same size while changing the temperature difference between the edges and the central portion of skelp by use of the apparatus of the invention and conventional apparatus in which the temperature of the entire skelp is raised to the butt-welding temperature within the heating furnace.

TABLE 1

| Temperature Difference | Apparatus of the Invention | Conventional Apparatus |
|---|---|---|
| 50° C. | 0.31% | 0.63% |
| 100° C. | 0.47% | 1.36% |
| 200° C. | 0.78% | 5.73% |

As seen from Table 1, the apparatus of the present invention considerably reduces the defective bead production percentage for all the temperaure differences as compared with the conventional apparatus. It is understandable that the percentage for the apparatus is much less the larger the temperature difference.

FIGS. 15(a) and 15(b) are histograms, in which distribution of flatness values resulting from a flatness test for strength at the seamed portion of continuously butt-welded pipes produced by the apparatus of the invention and the conventional apparatus as shown. FIG. 15(a) shows the results for the invention and FIG. 15(b)

the results for the conventional apparatus. In the test, the continuously butt-welded pipe is laid horizontal with the seamed portion facing laterally, and the pipe has a vertical load imposed on it. When damage occurs in the seamed portion, the height of the partially flattened pipe is divided by average outer diameter thereof and the quotient is the flatness value. In FIGS. 15(a) and 15(b), this value is shown on the abscissa, and the number of pipes having the flatness value in a given range is shown on the ordinate. The number N of specimens in this test was 54, both for the apparatus of the invention and the conventional apparatus. The average value $\overline{X}$ is 0.201 for the pipes produced on the apparatus according to the invention, and 0.213 for the pipes produced on the conventional apparatus. The standard deviation is 0.044 for pipes produced on apparatus according to the invention and 0.043 for pipes produced on the conventional apparatus.

As seen from the histograms in FIGS. 15(a) and 15(b), the flatness value, in other words, the butt-welding strength, of continuously butt-welded pipe produced by the apparatus of the invention is almost the same as that for pipes produced by the conventional apparatus.

FIG. 16 is a graph showing comparative test results for thickness distribution at each circumferential part of a continuously butt-welded pipe where the seamed portion is cooled according to the invention and for other cases where it is not so cooled. The ordinate shows thickness (mm), and the abscissa shows locations of thickness measurements circumferentially of the pipe. The solid line in the graph represents the values for a pipe in which the seamed portion was cooled with an amount of water corresponding to the temperature thereof by use of the apparatus according to the invention, the broken line represents values where there has been no cooling of the seamled portion, and the one-dot-dash line represents the values where cooling of the seamed portion was simply by spraying a constant amount of water. The positions at which the thickness of the specimen was measured are as shown in FIG. 17, in which the seamed portion is at g.

As seen from the graph of FIG. 16, when the apparatus of the invention was used for controlling the cooling of the seamed portion, the pipe has a substantially uniform thickness throughout the periphery thereof. On the contrary, when the seamed portion was merely sprayed by a constant amount of water, thickness increase occurred at the seamed portion. When there was no cooling of the seamed portion, a rather large thickness increase was found to occur especially at the inner periphery, and also a large variation in thickness occured throughout the periphery of pipe.

A modified embodiment of the heater according to the invention will be described which can be used for the main heater or the sub-heater in the above-described apparatus, or can replace both the heaters.

Figure 19:
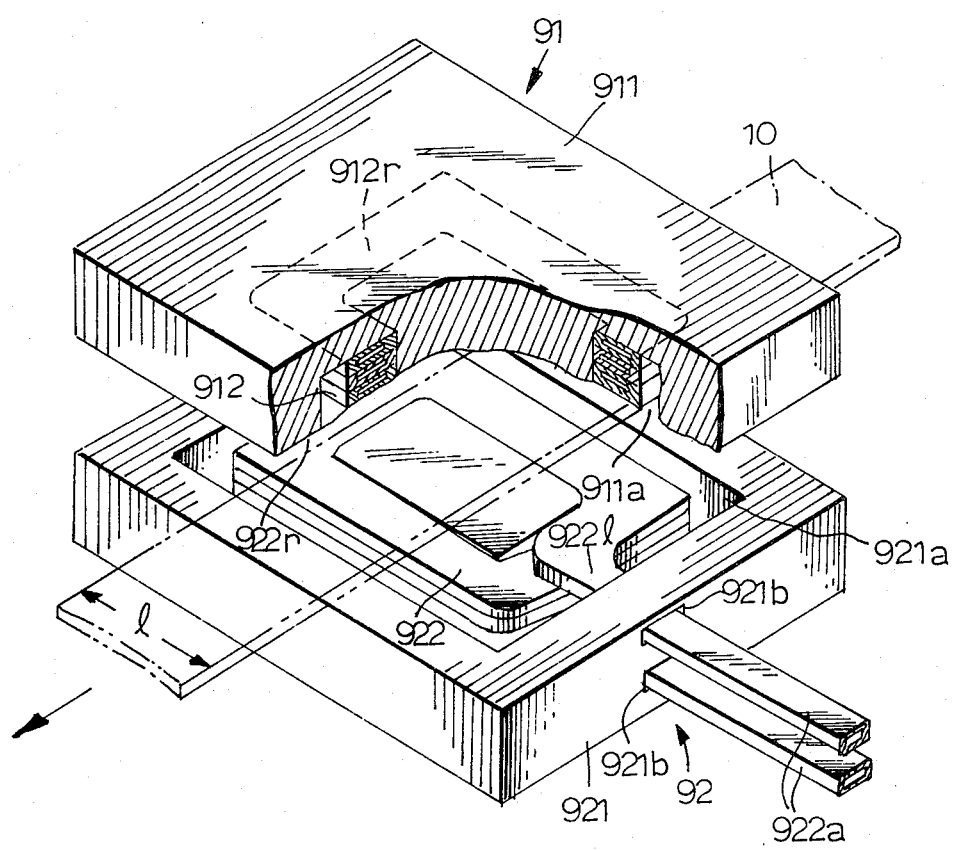
FIG. 19 is a partially cut away perspective view of the heater coil in the heater of FIG. 18.

The above heater and a control system therefor is shown in FIG. 18 and the heating coils therefor are shown in FIG. 19. The heater 2' is usable as both the main heater and the sub-heater. The skelp 10 discharged from the heating furnace passes between vertically spaced opposed coils 91 and 92 and then travels toward the bending rolls 4 and butt-welding rolls 5.

Induction heating coils 91 and 92, as shown in FIG. 19, comprise cores 911 and 921 and coil bodies 912 and 922 fitted into grooves 911a and 921a formed in the lower surface of core 911 and the upper surface of core 921, respectively. The respective cores 911 and 921 are constituted by strip-shaped silicon steel plates punched to form recesses corresponding to the grooves 911a and 921a, the silicon steel plates being laminated having a rectangular shape when viewed in plan. The plates are bound by bands (not illustrated) or the like and provided on the surfaces opposed to the skelp with heat insulators for preventing damage to the coil bodies 912 and 922. The grooves 911a and 921a are generally rectangular and the parts are parallel to the four sides of the cores 911 and 921, respectively. The coil bodies 912 and 922 are rectangular in shape and are formed by long hollow copper bands is wound in layers along the grooves 911a and 921a and insulated from each other by varnish. The ends 912a and 922a of the respective coil bodies 912 and 922 extend out of the coils through bores 911b and 921b in the cores 911 and 921, respectively. The coil bodies 912 and 922 have current of a given frequency flowing therethrough.

Referring to FIG. 18, the mounting frame 93 for the coils comprises a vertical bar 931 and upper and lower arms 932 and 933 connected to the uppr and lower ends of bar 931 and extending parallel to each other so as to give the frame a C-like shape when viewed from the front. The coil 91 is fixed to the lower surface of upper arm 932 and has the coil body 912 at the lower surface of coil 91. The coil 92 is fixed to the upper surface of lower arm 933 and has the coil body 922 at the upper surface of coil 92. The longer portions 912l and 912r of the coil body 912 and 922l and 922r at the coil body 922 are aligned with the edges El and Er of skelp 10.

Figure 20:
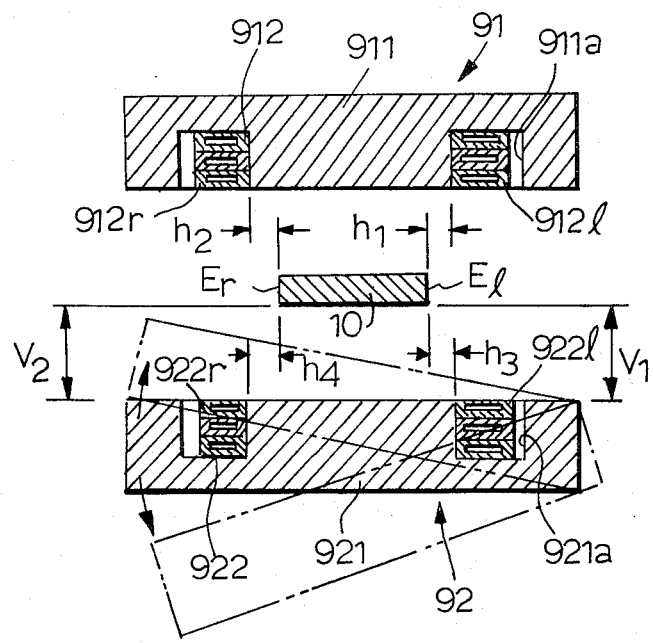
FIG. 20 is a diagrammatic sectional view for explaining the function of the heater coil shown in FIG. 19.
Figure 21:
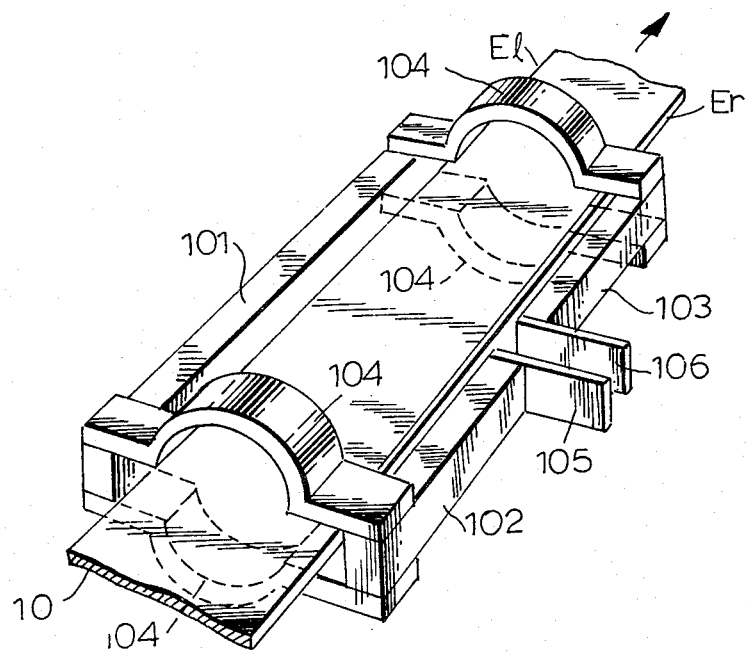
FIG. 21 is a perspective view of a prior art inductor.

Suspension rods 94 are mounted on the upper surface of arm 932 and extend vertically upward therefrom, and wheels 941 are journalled on the upper ends of rods 94 and run on a rail 942. The mounting frame 93 is suspended from the rail 942 which extends horizontally and transversely to the direction of movement of skelp 10, and is movable in a direction perpendicular to the direction of movement of the skelp 10 for positioning the vertical bar 931 laterally of edge El and skelp 10 and for keeping the coils 91 and 92 opposed to the upper and lower surfaces of skelp 10, respectively. A motor 943 is positioned on the upper surface of upper arm 932 and the output shaft thereof is coupled through a chain with a sprocket 944 coaxially mounted on one wheel 941. The motor 943 rotates in opposite directions to move the mounting frame 93 perpendicularly to the direction of movement of the skelp 10, so that the distances $h_1$, $h_2$, $h_3$ and $h_4$ between the edges El and Er and the longer coil portions 912l, 912r, 922l and 922r, as shown in FIG. 20, can be adjusted. The lower arm 933 is pivoted to the lower end of vertical bar 931 on a horizontal shaft 933a fixed to the base of arm 933 and is movable vertically around the shaft 933a. The horizontal shaft 933d has a gear 933b on one axial end meshing with a a gear 933c which in turn meshes with a gear on the output shaft of a motor 945 mounted on the lower end of vertical bar 931, so that when the motor 945 rotates one way or the other it swings the lower arm 933 around the shaft 933a, as illustrated by the broken lines in FIG. 20, thereby changing vertical distances $v_1$ and $v_2$ between the edges El and Er of skelp 10 and the surfaces of the longer portions 922l and 922r of coil body 921.

Reference numeral 95 designates a drive control for the motors 943 and 945. The drive control 95, comprising a microcomputer system like said control units 28 and 37, has temperature sensors 96l and 96r connected thereto through a temperature difference signal generator 97 and has temperature sensors 98l and 98r connected thereto through a feedback circuit 99. The sensors 96*l* and 96*r* are disposed opposite the edges El and Er of skelp 10 upstream of the coils 91 and 92. The temperatures detected at the edges El and Er are fed into the temperature difference signal generator 97 and the difference between the temperatures of the edges is detected and is fed into the drive control 95. The drive control 95 provides drive signals to the motors 943 and 945 for driving the motor 943 so as to move the mounting frame 93 across the skelp 10 along the rail 942 and for driving the motor 945 to swing the lower arm 933 vertically around the bottom of bar 931 to thereby adjust the size of the horizontal distances $h_1$, $h_2$, $h_3$ and $h_4$ between the portions 912*l*, 912*r*, 922*l* and 922*r* of the coil bodies 912 and 922 and the edges El and Er of the skelp 10 and the vertical distance $v_1$ and $v_2$ between the portions 922*l* and 922*r* and the edges El and Er so as to eliminate the difference between the temperatures at the edges El and Er. The temperature sensors 98*l* and 98*r* disposed downstream from the coil 91 and 92 detect the temperatures of the edges El and Er after the skelp 10 has been heated by the coils 91 and 92, and these temperatures are fed back to the control unit 95 through the feedback circuit 99. The control unit 95 generates no signal when the temperature difference between the edges is zero, but when a temperature difference exists, it supplies the motors 943 and 945 with drive signals for adjusting the horizontal and/or vertical distances $h_1$ and $h_2$, $v_1$ and $v_2$ to eliminate the temperature difference.

The sensors 98*l* and 98*r*, which detect the temperature of the edges of the skelp for correction of the positions of the coils 91 and 92, may also be used to determine whether or not the edges have been heated to the desired butt-welding temperature.

The ratio of the adjustment of movement of the mounting frame 933 and the swinging motion of the lower arm 933, is not limited to any particular value, but the adjustment may be carried out, for example, by rough adjustment of the movement of the mounting frame 93 across the width of the skelp 10 and fine adjustment of the vertically swinging lower arm 933, or by moving the mounting frame 93 in response to the temperature difference detected by the sensors 96*l* and 96*r* and swinging the lower arm 933 for compensating adjustment in response to the temperatures detected by the sensors 98*l* and 98*r*.

When high frequency current at the predetermined frequency flows in the coil bodies 912 and 922, magnetic flux is generated in the skelp 10 to induce a flow of induced current in the skelp 10, and concentrating in the edges El and Er, to thereby heat up substantially only the edges. A change of the horizontal or vertical distance between the edges El and Er and the coil bodies 912 and 922 causes the magnetic flux flowing in the skelp 10 to change. As a result, the induced current generated in the skelp 10 changes and the energy by which the edges El and Er are heated also changes. The heater 2' thus changes the horizontal distances $h_1$ and $h_4$ and vertical distances $v_1$ and $v_2$ so as to change electromagnetic relation of the coils 91 and 92 with the skelp 10 for making the temperature of the edges El and Er equal.

Alternatively, one of the coils 91 and 92 may of course be fixed and the other may be horizontally movable or vertically swingable.

As clearly understood from the aforesaid description, in the apparatus according to the invention, the skelp, after being heated in the heating furnace, further has only the edges thereof heated up to the butt-welding temperature by induction heating, and the central portion of the skelp is kept at a low temperature. Hence, considerable saving of energy is achieved. Moreover, temperatures of the edges of the skelp are adjusted easily and reliably so that they are equal, so that the two edges, when they are butt-welded, the deformation resistance is equalized and due to the constant control of the pressure load applied to the skelp by the butt-welding rolls, the edges are butt-welded under uniform upsetting stress, so that the amount of upset is uniform, resulting in a reduced height of the bead, less variation in the thickness and outer diameter of the pipe thickness, and a reduced amount of increase in the thickness in the vicinity of seamed portion.

Furthermore, just prior to contraction rolling or midway thereof, the butt-welded portion of the pipe is cooled down to the temperature of the remainder of the pipe so that no thickness increase occurs at the seamed portion of the pipe during contraction rolling. Moreover, the strength of the seamed portion is improved as compared with the seamed portion of the pipe manufactured by conventional apparatus which heats the whole skelp to the welding temperature in the heating furnace. Hence, the apparatus of the invention considerably improves the continuous manufacturing of butt-welded pipes.

Because many widely different embodiments of this invention may be made without departing from the spirit and scope thereof, it is to be understood that the invention is not limited to the specific embodiments described, but rather is limited only as defined in the appended claims.

What is claimed is:

1. An apparatus for continuous manufacture of butt-welded pipes, comprising:
    a heating furnace for heating a skelp continuously passed therethrough up to a predetermined temperature;
    a heater means having at least one heater with spaced opposed induction heating coil means on opposite sides of the path along which the skelp is passed through said heater means, said induction heating coil means being a pair of induction heating coils positioned in spaced opposed relative above and below the path of the skelp, said coils having a generally rectangular shape with a width at least as wide as the skelp and having the longer side substantially aligned with the edge portions of the skelp passing through the space between said coils in a position for concentrating the current induced in the skelp for heating only the edge portions of the skelp discharged from said heating furnace up to the butt-welding temperature, and having means connected to at least one of said induction heating coil means for varying the electromagnetic coupling between said one induction heating coil means and the corresponding edge portion of the skelp for adjusting the temperature to which the corresponding edge portion is heated;
    bending means adjacent the outlet end of said heater means for bending the skelp into a generally tubular form; and
    butt-welding rolls adjacent the outlet end of said bending means for applying a predetermined pressure to the bent up skelp for butt-welding the edges of the skelp to each other.

2. An apparatus as claimed in claim 1 in which means for varying the electromagnetic coupling is connected to both of said induction heating coil means.

3. An apparatus as claimed in claim 1 further comprising means for changing the positions of said butt-welding rolls for adjusting the pressure applied to the butt-welded portion of the skelp, sensor means engaged by said butt-welding rolls for sensing the pressure which the rolls apply to the butt-welded portion of the skelp, and control means connected to said pressure adjusting means and to said sensor for controlling the pressure to a pressure for limiting the height of the bead at the butt-welded portion of the skelp to a predetermined height.

4. An apparatus as claimed in claim 1 in which said coils are fixed in position relative to the path of movement of the skelp, and said means for varying the electromagnetic coupling comprise means for varying current supplied to said coils.

5. An apparatus as claimed in claim 4 in which said means for varying the current comprise a temperature sensing means adjacent the path of the skelp for sensing at least the temperatures of the edge portions of the skelp, means connected to said temperature sensing means for determining from the temperatures sensed the difference of the temperatures of the edge portions of the skelp and the desired butt-welding temperature, and current regulating means connected to said determining means and to said coils for supplying currents to said coils for heating the edge portions of the skelp to the desired butt-welding temperature.

6. An apparatus as claimed in claim 1 in which one of said coils is mounted for movement transversely of the direction of movement of the skelp between said coils for varying the current induced in the skelp depending on the position of the movable coil relative to the skelp, and said means for varying the electromagnetic coupling comprises means for moving said one coil.

7. An apparatus as claimed in claim 6 in which said means for moving said one coil comprise a temperature sensing means adjacent the path of the skelp for sensing at least the temperatures of the edge portions of the skelp, means connected to said temperature sensing means for determining from the temperatures sensed the difference of the temperatures of the edge portions of the skelp and the desired butt-welding temperature, and moving means connected to said determining means to said one coil for moving said one coil for varying the current induced in the skelp to produce the desired temperature.

8. An apparatus as claimed in claim 6 in which said means for moving said one coil comprise a temperature sensing means adjacent the path of the skelp for sensing at least the temperatures of the edge portions of the skelp, means connected to said temperature sensing means for determining from the temperatures sensed the difference between the temperatures of the edge portions of the skelp, and said means being connected to said moving means for moving said one coil for varying the current induced in the skelp to eliminate said difference.

9. An apparatus as claimed in claim 1 in which one of said coils is mounted for movement perpendicular to the direction of movement of the skelp between said coils for varying the current induced in the skelp depending on the position of the movable coil relative to the skelp, and said means for varying the electromagnetic coupling comprises means for moving said one coil.

10. An apparatus as claimed in claim 9 in which said means for moving said one coil comprise a temperature sensing means adjacent the path of the skelp for sensing at least the temperature of the edge portions of the skelp, means connected to said temperature sensing means for determining from the temperatures sensed the difference of the temperatures of the edge portions of the skelp and the desired butt-welding temperature, and moving means connected to said determining means and to said one coil for moving said one coil for varying the current induced in the skelp to produce the desired temperature.

11. An apparatus as claimed in claim 9 in which said means for moving said one coil comprise a temperature sensing means adjacent the path of the skelp for sensing at least the temperature of the edge portions of the skelp, means connected to said temperature sensing means for determining from the temperatures sensed the defference between the temperatures of the edge portions of the skelp, and said means also being connected to said moving means for moving said one coil for varying the current induced in the skelp to eliminate said difference.

12. An apparatus as claimed in claim 1 in which one of said coils is mounted for movement transversely of the direction of movement of the skelp between said coils for varying the current induced in the skelp depending on the position of the movable coil relative to the skelp, and the other of said coils is mounted for movement perpendicular to the direction of movement of the skelp between said coils for varying the current induced in the skelp depending on the position of the movable coil relative to the skelp, and said means for varying the electromagnetic coupling comprises means for moving said coils.

13. An apparatus as claimed in claim 12 in which said means for moving coils comprises a temperature sensing means adjacent the path of the skelp for sensing at least the temperature of the edge portions of the skelp, means connected to said temperature sensing means for determining from the temperatures sensed the difference of the temperatures of the edge portions of the skelp and the desired butt-welding temperature, and moving means connected to said determining means and to said coils for moving said coils for varying the current induced in the skelp to produce the desired temperature.

14. An apparatus as claimed in claim 12 in which said means for moving said coils comprise a temperature sensing means adjacent the path of the skelp for sensing at least the temperature of the edge portions of the skelp, means connected to said temperature sensing means for determining from the temperatures sensed the difference between the temperatures of the edge portions of the skelp, and said means also being connected to said moving means for moving said coils for varying the current induced in the skelp to eliminate said difference.

15. An apparatus as claimed in claim 12 in which said means for moving said coils comprises a temperature sensing means adjacent the path of the skelp for sensing at least the temperature of the edge portions of the skelp, means connected to said temperature sensing means for determining from the temperature sensed the difference of the temperatures of the edge portions of the skelp and the desired butt-welding temperature, moving means connected to said determining means and to one of said coils for moving said one coil for varying the current induced in the skelp to produce the desired temperature, a further temperature sensing means adjacent the path of the skelp for sensing at least the temperature of the edge portions of the skelp, further means connected to said further temperature sensing means for determining from the temperatures sensed the difference between the temperatures of the edge portions of the skelp, further moving means connected to said further means and to the other of said coils for moving said other coil for varying the current induced in the skelp to eliminate said difference.

16. An apparatus as claimed in claim 1 further comprising a plurality of contracting rolls adjacent the outlet of said butt-welding rolls, and a cooling means ahead of at least all but one of said contracting rolls in the direction of movement of the welded pipe for directing a cooling medium against the butt-welding pipe in an amount no more than an amount sufficient for cooling the seamed portion of the pipe to the temperature of the remainder of the pipe.

17. An apparatus as claimed in claim 16 in which said cooling means is ahead of the first contracting rolls relative to the direction of movement of the welded pipe.

18. An apparatus as claimed in claim 16 in which said cooling means is after one of said contracting rolls relative to the direction of movement of the welded pipe.

19. An apparatus as claimed in claim 16 in which said cooling means comprises temperature sensing means ahead of said cooling means for sensing the temperature of the seamed portion of the pipe and the temperature of the remaining portion of the pipe, means for directing cooling medium against the seamed portion of the pipe, valve means connected to said cooling medium directing means for controlling the flow of cooling medium to said cooling medium directing means, velocity sensing means for sensing the velocity of the pipe as it comes from said butt-welding rolls, and control means connected to said valve means and to which said temperature sensing means and said velocity sensing means is connected and having means for receiving information as to the outside diameter and thickness of the pipe and for determining the amount of cooling medium needed to cool the seamed portion of the pipe from the temperature as it comes from the butt-welding rolls to the temperature of the remaining portion of the pipe and controlling the time said valve is open to permit only the necessary amount of cooling medium to be directed against the seamed portion of the pipe.

* * * * *